US011748955B2

(12) United States Patent
You et al.

(10) Patent No.: US 11,748,955 B2
(45) Date of Patent: Sep. 5, 2023

(54) NETWORK-BASED SPATIAL COMPUTING FOR EXTENDED REALITY (XR) APPLICATIONS

(71) Applicant: Nokia Technologies Oy, Espoo (FI)

(72) Inventors: Yu You, Kangasala (FI); Peter Fasogbon, Tampere (FI); Emre Aksu, Tampere (FI); Igor Danilo Diego Curcio, Tampere (FI); Saba Ahsan, Espoo (FI); Ville-Veikko Mattila, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/495,329

(22) Filed: Oct. 6, 2021

(65) Prior Publication Data

US 2022/0108534 A1   Apr. 7, 2022

Related U.S. Application Data

(60) Provisional application No. 63/088,127, filed on Oct. 6, 2020.

(51) Int. Cl.
| | | |
|---|---|---|
| *G06T 19/00* | (2011.01) | |
| *G06F 16/487* | (2019.01) | |
| *H04L 67/131* | (2022.01) | |

(52) U.S. Cl.
CPC .......... *G06T 19/006* (2013.01); *G06F 16/487* (2019.01); *H04L 67/131* (2022.05)

(58) Field of Classification Search
None
See application file for complete search history.

(56) References Cited

U.S. PATENT DOCUMENTS

| | | |
|---|---|---|
| 10,304,239 B2 | 5/2019 | Gorur Sheshagiri et al. |
| 10,665,037 B1 | 5/2020 | Brimhall et al. |
| 10,692,299 B2 | 6/2020 | Bhushan et al. |
| 10,748,302 B1 | 8/2020 | Dine et al. .................. 345/633 |

(Continued)

OTHER PUBLICATIONS

PCT International Search Report and Written Opinion for PCT/FI2021/050658, 2022.

(Continued)

*Primary Examiner* — Yingchun He
(74) *Attorney, Agent, or Firm* — Harrington & Smith

(57) ABSTRACT

Feature information is received from a client device and describes extended reality scene(s) in an extended reality (ER) environment at the client device. An ER description is formed in an ER description format corresponding to the feature information and is stored. Some of the stored ER description format is provided in a representational format upon request of the client device or other client devices viewing the one or more ER scenes and assisting the positioning of corresponding client devices in the ER environment. A client device captures environmental visual data and generates feature information, describing ER scene(s) in an extended reality environment at the client device, from the environmental visual data, and sends the generated feature information toward a server. A client device can localize itself in a 3D environment of an ER description, and generate ER anchors and objects, link them, and send them to a server.

25 Claims, 14 Drawing Sheets

(56) References Cited

U.S. PATENT DOCUMENTS

| | | | |
|---|---|---|---|
| 2018/0024362 A1* | 1/2018 | Williamson | G06T 19/006 345/428 |
| 2019/0028691 A1* | 1/2019 | Hinds | H04N 21/4518 |
| 2020/0090407 A1 | 3/2020 | Miranda et al. | 19/6 |
| 2020/0111255 A1 | 4/2020 | Brodsky et al. | |
| 2021/0333863 A1* | 10/2021 | Chen | G06F 3/0346 |
| 2022/0053224 A1* | 2/2022 | Katsumata | H04N 21/23412 |
| 2022/0207832 A1* | 6/2022 | Yoo | G06T 19/003 |

OTHER PUBLICATIONS

Rekhil M Kumar et al., "A Survey on Image Feature Descriptors", International Journal of Computer Science and Information Technologies (IJCSIT), vol. 5 (6), 2014, 7668-7673.

M.Y.I. Idris, H. Arof, E.M. Tamil, N.M. Noor and Z. Razak, 2009. Review of Feature Detection Techniques for Simultaneous Localization and Mapping and System on Chip Approach. Information Technology Journal, 8: 250-262.

Jeroen Zijlmans, "LSD-slam and ORB-slam2, a literature based explanation", Medium, Aug. 23, 2017, downloaded from https://medium.com/@j.zijlmans/lsd-slam-vs-orb-slam2-a-literature-based-comparison-20732df431d.

Ethan Rublee et al., "ORB: an efficient alternative to SIFT or SURF", 2011 IEEE International Conference on Computer Vision.

Chuan Luo et al., "Overview of Image Matching Based on ORB Algorithm", 2019 J. Phys.: Conf. Ser. 1237 032020.

David G. Lowe, Distinctive Image Features from Scale-Invariant Keypoints, International Journal of Computer Vision 60(2), 91-110, 2004.

Herbert Bay et al., "SURF: Speeded Up Robust Features", A. Leonardis, H. Bischof, and A. Pinz (Eds.): ECCV 2006, Part I, LNCS 3951, pp. 404-417, 2006.

Michael Calender et al., "BRIEF: Binary Robust Independent Elementary Features", In: Daniilidis K., Maragos P., Paragios N. (eds) Computer Vision—ECCV 2010. ECCV 2010, Lecture Notes in Computer Science, vol. 6314, Springer, Berlin, Heidelberg, https://doi.org/10.1007/978-3-642-15561-1_56.

Raul Mur-Artal and Juan D. Tardos, "ORB-SLAM2: an Open-Source SLAM System for Monocular, Stereo and RGB-D Cameras", arXiv: 1610.06475, Oct. 20, 2016.

3rd Generation Partnership Project; Technical Specification Group Services and System Aspects; Extended Reality (XR) in 5G (Release 16) 3GPP TR 26.928 V16.0.0 (Mar. 2020).

"Augmented Reality Framework (ARF); AR framework architecture", ETSI GS ARF 003 V1.1.1 (Mar. 2020).

* cited by examiner

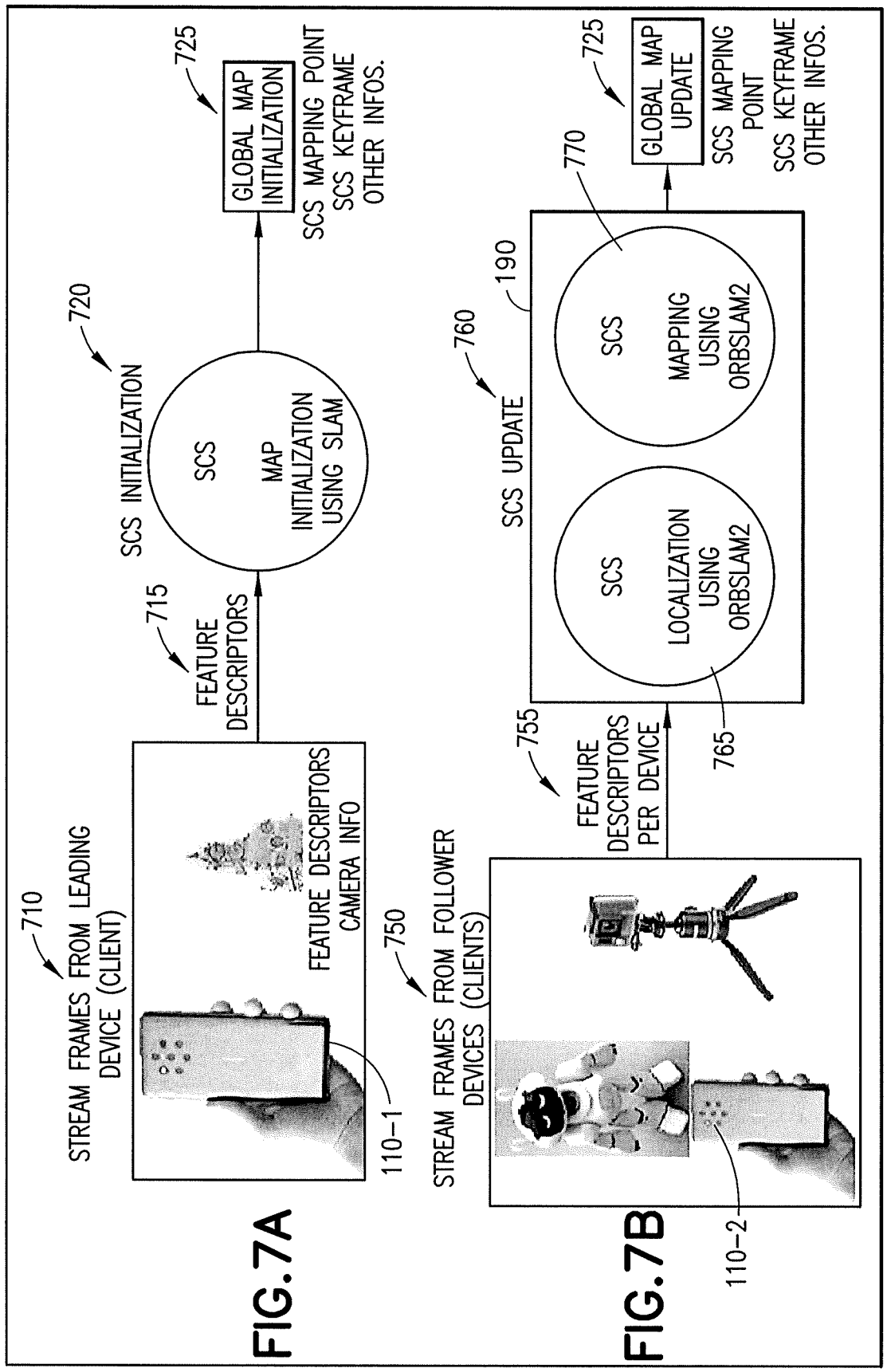

NETWORK-BASED SPATIAL COMPUTING FOR EXTENDED REALITY (XR) APPLICATIONS

CROSS-REFERENCE TO RELATED APPLICATIONS

The present application claims the benefit under 35 U.S.C. § 119(e) of U.S. Provisional Patent Application No. 63/088,127, filed on Oct. 6, 2020, the disclosure of which is hereby incorporated by reference in its entirety. Any and all applications for which a foreign or domestic priority claim is identified in the Application Data Sheet of the present application are hereby incorporated by reference under 37 CFR § 1.57.

TECHNICAL FIELD

Exemplary embodiments herein relate generally to virtual reality and, more specifically, relate to network-based spatial computing for extended reality (XR) applications.

BACKGROUND

There are a number of immersive reality technologies, where a person is immersed in a different reality. All immersive technologies extend the reality experienced by a person by either blending the virtual and "real" worlds or by creating a fully immersive experience.

Such technologies include augmented reality (AR), where virtual information and objects are overlaid on the real world. Meanwhile, in a virtual reality (VR) experience, users are fully immersed in a simulated digital environment. In mixed reality (MR), digital and real-world objects co-exist and can interact with one another in real-time. Extended Reality (XR) is a term that encompasses all the immersive technologies.

XR could be improved, particularly in the context of wireless networks such as cellular networks.

BRIEF SUMMARY

This section is intended to include examples and is not intended to be limiting.

In an exemplary embodiment, a method is disclosed that includes receiving, from a client device in a wireless network, feature information describing at least part of one or more extended reality scenes in an extended reality environment at the client device. The method includes forming an extended reality description in an extended reality description format corresponding to the feature information, and storing the extended reality description format in a database. The method further includes providing at least a portion of the stored extended reality description format in a representational format upon request of the client device or other client devices viewing the one or more extended reality scenes and assisting the positioning of corresponding client devices in the extended reality environment.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus at least to: receive, from a client device in a wireless network, feature information describing at least part of one or more extended reality scenes in an extended reality environment at the client device; form an extended reality description in an extended reality description format corresponding to the feature information; store the extended reality description format in a database; and provide at least a portion of the stored extended reality description format in a representational format upon request of the client device or other client devices viewing the one or more extended reality scenes and assisting the positioning of corresponding client devices in the extended reality environment.

An exemplary computer program product includes a computer-readable storage medium bearing computer program code embodied therein for use with a computer. The computer program code includes: code for receiving, from a client device in a wireless network, feature information describing at least part of one or more extended reality scenes in an extended reality environment at the client device; code for forming an extended reality description in an extended reality description format corresponding to the feature information; code for storing the extended reality description format in a database; and code for providing at least a portion of the stored extended reality description format in a representational format upon request of the client device or other client devices viewing the one or more extended reality scenes and assisting the positioning of corresponding client devices in the extended reality environment.

In another exemplary embodiment, an apparatus comprises means for performing: receiving, from a client device in a wireless network, feature information describing at least part of one or more extended reality scenes in an extended reality environment at the client device; forming an extended reality description in an extended reality description format corresponding to the feature information; storing the extended reality description format in a database; and providing at least a portion of the stored extended reality description format in a representational format upon request of the client device or other client devices viewing the one or more extended reality scenes and assisting the positioning of corresponding client devices in the extended reality environment.

In an exemplary embodiment, a method is disclosed that includes capturing, by a client device in a wireless network, environmental visual data and generating feature information from the environmental visual data. The feature information describes at least part of one or more extended reality scenes in an extended reality environment at the client device. The method includes sending, by the client device, the generated feature information toward a server.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus at least to: capture, by a client device in a wireless network, environmental visual data and generating feature information from the environmental visual data, the feature information describing at least part of one or more extended reality scenes in an extended reality environment at the client device; and send, by the client device, the generated feature information toward a server.

An exemplary computer program product includes a computer-readable storage medium bearing computer program code embodied therein for use with a computer. The computer program code includes: code for capturing, by a client device in a wireless network, environmental visual data and generating feature information from the environmental visual data, the feature information describing at least part of one or more extended reality scenes in an extended reality environment at the client device; and code for sending, by the client device, the generated feature information toward a server.

In another exemplary embodiment, an apparatus comprises means for performing: capturing, by a client device in a wireless network, environmental visual data and generating feature information from the environmental visual data, the feature information describing at least part of one or more extended reality scenes in an extended reality environment at the client device; and sending, by the client device, the generated feature information toward a server.

In an exemplary embodiment, a method is disclosed that includes localizing, by a client device in a wireless system and in response to extended reality description being available, the client device to a physical environment with help of the extended reality description. The localizing places the client device into a three-dimensional environment to which the extended reality description refers. The method includes generating extended reality anchors and extended reality objects to place the extended reality anchors and the extended reality objects in the three-dimensional environment to which the extended reality description refers. The method also includes binding the extended reality anchors and the extended reality objects to create corresponding one or more links between the extended reality anchors and the extended reality objects. The method further comprises sending the extended reality anchors and the extended reality objects to the server, associated with correspondent extended reality description.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus at least to: localize, by a client device in a wireless system and in response to extended reality description being available, the client device to a physical environment with help of the extended reality description, the localizing placing the client device into a three-dimensional environment to which the extended reality description refers; generate extended reality anchors and extended reality objects to place the extended reality anchors and the extended reality objects in the three-dimensional environment to which the extended reality description refers; bind the extended reality anchors and the extended reality objects to create corresponding one or more links between the extended reality anchors and the extended reality objects; and send the extended reality anchors and the extended reality objects to the server, associated with correspondent extended reality description.

An exemplary computer program product includes a computer-readable storage medium bearing computer program code embodied therein for use with a computer. The computer program code includes: code for localizing, by a client device in a wireless system and in response to extended reality description being available, the client device to a physical environment with help of the extended reality description, the localizing placing the client device into a three-dimensional environment to which the extended reality description refers; code for generating extended reality anchors and extended reality objects to place the extended reality anchors and the extended reality objects in the three-dimensional environment to which the extended reality description refers; code for binding the extended reality anchors and the extended reality objects to create corresponding one or more links between the extended reality anchors and the extended reality objects; and code for sending the extended reality anchors and the extended reality objects to the server, associated with correspondent extended reality description.

In another exemplary embodiment, an apparatus comprises means for performing: localizing, by a client device in a wireless system and in response to extended reality description being available, the client device to a physical environment with help of the extended reality description, the localizing placing the client device into a three-dimensional environment to which the extended reality description refers; generating extended reality anchors and extended reality objects to place the extended reality anchors and the extended reality objects in the three-dimensional environment to which the extended reality description refers; binding the extended reality anchors and the extended reality objects to create corresponding one or more links between the extended reality anchors and the extended reality objects; and sending the extended reality anchors and the extended reality objects to the server, associated with correspondent extended reality description.

BRIEF DESCRIPTION OF THE DRAWINGS

In the attached Drawing Figures:

FIG. 7, including both FIGS. 7A and 7B, illustrates a visual SLAM implementation of SCS, in accordance with exemplary embodiment, where FIG. 7A implements SCS initialization and FIG. 7B implements an SCS update;

FIG. 8A is a flow diagram showing the operations that XR description (e.g., a global map) is performed completely on the SCS, while

DETAILED DESCRIPTION OF THE DRAWINGS

Figure 1:
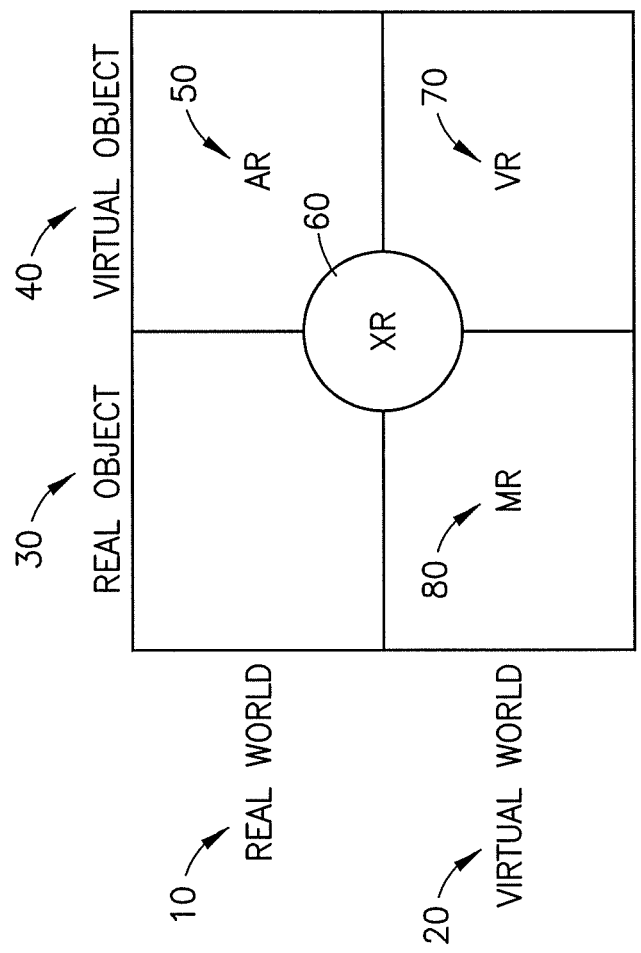
FIG. 1 is an illustration of extended reality (XR) scope.

Abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As described above, Extended Reality (XR) is a term that encompasses all the immersive technologies. XR systems leverage both physical and computer-generated environments with virtual objects, known as augmented reality (AR) and virtual reality (VR). People also call XR systems as mixed reality (MR) systems.

FIG. 1 is an illustration of XR scope. The vertical axis includes a real world 10 and a virtual world 20, and the horizontal axis includes a real object 30 and a virtual object 40. The real world 10 is also referred to as a physical world. AR 50 includes the real world 10 and a virtual object 40. VR 70 includes the virtual world 20 and a virtual object 40. The MR 80 includes the virtual world 20 and real object 30. XR 60 may include all elements in the diagram.

The exemplary embodiments herein are about the system and key interfaces with data presentations for a generic spatial computing service in the XR environments. In order to position the virtual objects in the world (either virtual 20 or physical 10), the exemplary embodiments herein define an XR spatial description, through which virtual objects, especially virtual media objects, can be positioned, rendered and played back. The specification can also enable the fusion of multiple inputs from different XR devices and different tracking or positioning technologies (e.g., radio based, and vision based) to work together.

It is useful to illustrate a use case as an example of XR and also what issues might arise for this use case. The XR use case is one of projecting Netflix (a subscription-based streaming service that allows members to watch TV shows and movies without commercials on an internet-connected device) on a wall. Consider the following.

1) Alice comes home after work. In the evening, she receives a notification message on her mobile device from Netflix about a new episode of her favorite series that is now available for watching (streaming content is ready).

2) Alice decides to watch the episode in AR mode. She puts on her AR glasses, which automatically pair with her mobile device.

3) She launches a Netflix app via her AR interface. She selects to play the new episode.

4) The video is now visible on her living room wall as a 100-inch screen.

4A) She may have previously selected the living room wall as her display for Netflix videos.

4B) She may have previously scanned and registered her living room via her AR device/mobile device and associated the wall in the living room as the spatial configuration with Netflix Media Player to the XR_5G Spatial Computing Service (a new service type).

5) Every spatial configuration that she makes related to her AR experience is stored in this service and can be re-called/updated.

6) Her initial position and orientation tracking are handled by a 5G spatial computing service.

6, Option 1) She streams her video from her AR device to a 5G service which then returns her localization information (e.g., place and orientation).

6, Option 2) She streams only the visual features through 5G service which then uses a SLAM-like algorithm to localize her and a registration algorithm to register her location/orientation based on pre-scanned spatial information.

7) Now she invites her friends/relatives to watch the video simultaneously together at the same physical space or different places remotely. The invitation can be performed via sharing the spatial configuration with the information about the physical space or a computer-generated virtual space.

8) When in the same physical space (AR mode), it is sufficient to share the spatial configuration together with any necessary timed data for synchronized playback experience. Each person would locate themselves individually and correctly with the shared spatial configuration (i.e., the virtual display on the wall).

9) When in a computer-generated virtual space, a spatial conversion is conducted by the SCS service to transform the spatial configuration of the living room to the virtual room (space) and shared with all participants with the same converted information about the display located in the virtual space. The same timed data for synchronized playback experience is shared as well among all participants.

Although the use case above assumes all these steps may be performed, this is currently challenging. For example, the following issues make this difficult:

a) There is a lack of a standardized service which can serve spatial information to clients in a harmonized and device-agnostic way.

b) There is a lack of a standard spatial environment description that can represent the physical environment. This includes one or more of a lack of the information relationship between physical and virtual worlds, a lack of description of media representation objects that can be represented in the augmented physical world, or a lack of persistency of such information c) There is a lack of a spatial computing entity/service to localize persons and to interact with XR objects (e.g., virtual Netflix streaming player on the wall) in the augmented physical environment.

The exemplary embodiments herein address some or all of these issues. First, an overview is presented, and then more details are presented.

As an overview, systems and methods described herein may include one or more of the following.

1) Generation and dissemination of XR spatial description, including XR description (e.g., scene description with tracking capabilities), XR anchors (e.g., XR object placeholder), and XR objects (e.g., media representation).

2) Generation of harmonized and/or fused XR spatial description from multiple homogeneous or heterogeneous XR clients/tracking techniques (visual and non-visual).

3) Provision of global registration and query capability for XR objects by XR systems via flexible searching criteria such as spatial or logical boundaries/criteria.

Concerning XR description generation and registration, at a server, the server in an exemplary embodiment can perform the following.

a) Receive a plurality of generated real/physical environment features (e.g., XR features).

b) Generate a standard and portable harmonized XR description that can work for both vision and radio frequency (RF)-based localization and tracking technologies.

c) Store generated XR description in a hierarchical data structure that represents its spatial relationship with a persistent format with the capabilities of multi-scaling and multi-source support. Such relationship is useful in many ways, e.g., for navigations from one place to another, and global coordinate registration from local coordinate systems. A persistent format may be a file format that can be stored, retrieved, and exchanged. Note that in addition to or instead of a persistent format, the hierarchical data structure may be stored in a payload format, which can be a file format that can be encoded and decoded. In an exemplary embodiment, "multi-scaling" means "pixel-to-meter" (or other length unit). That is, a 3D representation or graph can be mapped to different absolute scales such as to different lens parameters of the "multi-source". "Multi-source" means different types of client devices.

d) Provide XR description in a representational format (e.g., glTF) upon request of any client, e.g., a user equipment (UE), device, etc.

Alternatively, for a UE that is capable enough to generate XR Description, at a server, the server can perform the following in an exemplary embodiment.

a) Receive XR description generated on the UE.

b) Fuse XR description from the UE to one sharable/harmonized standardized XR description format with the following possible operations:

1) Convert uploaded XR description to a same or a common coordinate system;

2) Convert different XR information sources to a generic standardized format (e.g., Azure XR objects, Apple XR objects are converted to standardized 3GPP XR objects);

3) Scale up/down to a same global size;

4) Update existing XR Description with new XR data elements, e.g., environmental features.

At a client, e.g., a User Equipment (UE), at an environment building phase, the UE may perform the following in an exemplary embodiment:

a) Capture environment visual data (image, video, or other visual cues) and generate a plurality of XR Features (for the privacy concern) at one or multiple locations;

b) Upload generated XR Features to the server, e.g., XR Spatial Computing Server (SCS) for new XR Description generation;

c) Alternatively, generate a new XR Description directly on the device, and upload XR Description to the server for XR description fusion;

d) Alternatively, generate a temporary or intermediate representation of visual data (e.g., a feature map file/bitstream or alike), and stream this representation to the server for further processing such as XR description fusion and generation of final XR Description.

With respect to XR anchor creation and XR object binding, at a UE, when the XR Description is available, the UE can perform the following in an exemplary embodiment:

a) Localize itself to the physical environment with the help of XR description, e.g., using any spatial tracking techniques such as SLAM or RF-based approaches (e.g., indoor positioning);

b) Generate XR placeholders (e.g., XR anchors) and XR objects;

c) Complete further properties for XR anchors and XR objects;

d) Bind XR anchors and XR objects;

e) Send XR anchors and XR objects to the server, associated with correspondent XR Description.

Now that an overview has been provided, additional details are provided. As for terminology, the following exemplary definitions are provided. This terminology is used below.

XR Environment: Physical or virtual computer-generated scene with visual computer-generated interactive media object.

XR Client: A client that visualizes the XR environment with respect to the user or viewer's viewing direction. Traditional PC, mobile phone (e.g., one example of a UE), special display devices like VR HMD (head mounted display) and see-through AR glass with certain computing capabilities, can be treated as XR clients.

XR Description: A meta specification of the XR environment for the purpose of tracking and positioning the XR clients. The XR description may or may not define the whole structure of the environment but contains essential structural data for tracking.

XR Features: Digital information representing the unique characteristics about one location in a multi-dimensional space, for example, 2D or 3D space. For example, a 2D image can produce a 2D feature image which contains spatial abstractions/variables of original image, but where the pixel values hold information about the calculated features instead of colors. In 3D space, other non-visual features can be captured at each 3D location, e.g., RF-based signal sources or beacon information at given 3D location. An XR Feature defines an abstract and extensible structure supporting both visual and non-visual feature types.

XR Anchor: A spatial location object that defines its position in the XR environment. Anchors can have different types, from a single spatial point to a complex geometry; and have other attributes such as static or dynamic properties.

XR Object: Any media object that can be operated interactively with the user of the XR client. Typically, an XR Object is always associated with an XR Anchor. But an XR Anchor may have one or more XR objects linked (See FIG. 4, described below).

It is noted that these terms may be capitalized herein, such as "XR Object", or may be lowercase herein, such as "XR object". Unless there is a need to refer to a specific entity via capitalization of a corresponding term, the two ways of referring to these terms are assumed to be fungible.

Figure 2:
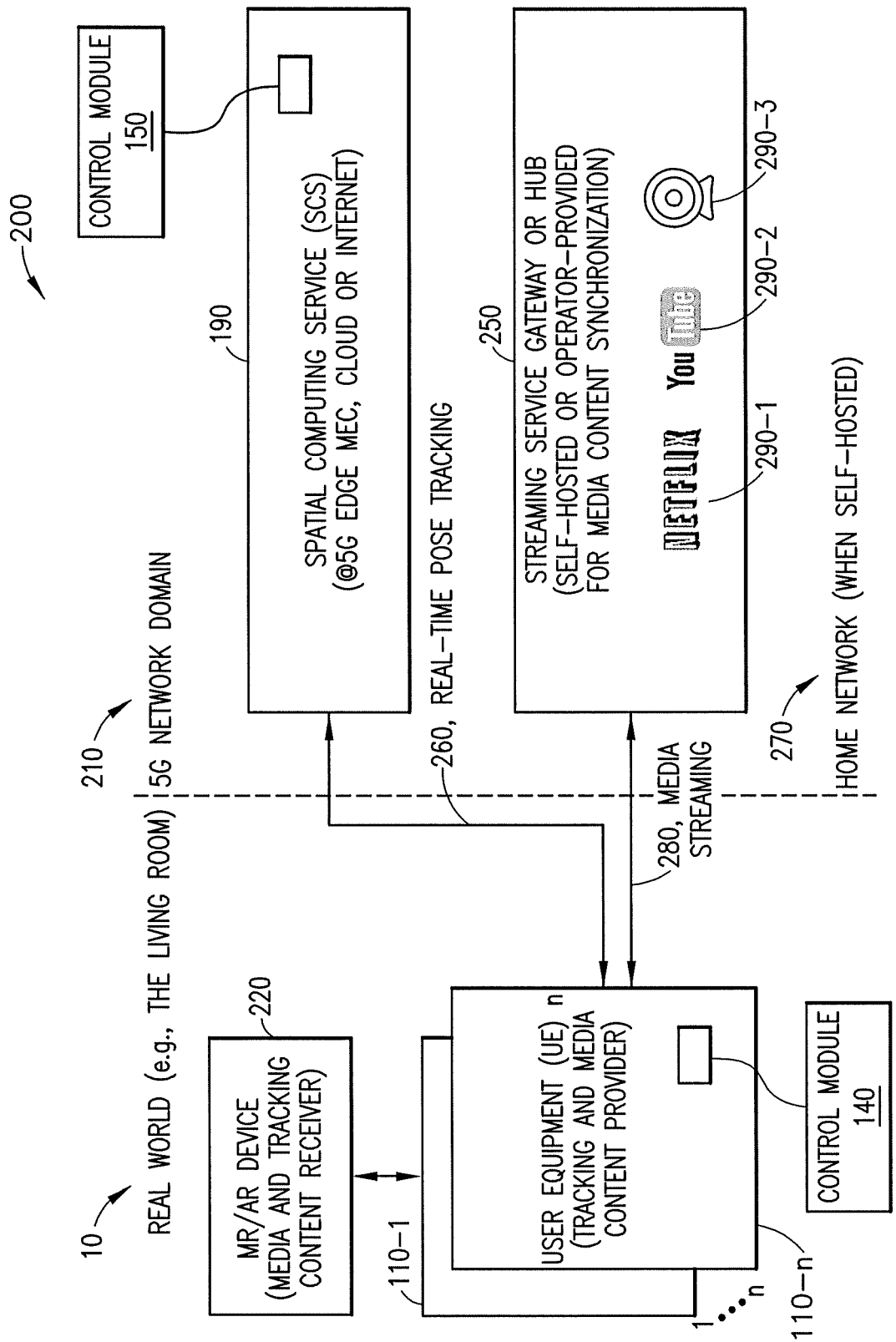
FIG. 2 illustrates a high-level block diagram of an exemplary system for implementing exemplary embodiments.

FIG. 2 illustrates a high-level block diagram of a system 200 for implementing exemplary embodiments and shows the system in a simplified view. There are two generalized sections, the real world 10 and a network domain 210 for example, a 5G (fifth generation) network. While applications to 5G are mainly described herein, applications to other networks (wired and wireless) like local area networks (LANs), Internet, and the like, are applicable too. The 5G network domain 210 is a wireless, cellular domain. The right side of the figure, instead of or in addition to the 5G network domain 210, may be implemented by a home network 270, when the system is self-hosted.

In the real world 10, there is an MR/AR device 220, which is a media and tracking content receiver. Typically, a receiver acts as a content player or rendering engine. Optionally, it can have computing resources for tracking if needed. There are n UEs 110-1 through 110-n, each of which is a tracking and media content provider. The receiver 220 is, typically, connected to one UE 110-1 at a time, as illustrated by the arrow in FIG. 2. Alternatively, the device 220 can be part of the UE.

The UEs 110 provide real-time pose tracking 260 to the spatial computing service (SCS), e.g., an SCS 190, which may be at (@) a 5G edge MEC, in the cloud, or in the Internet. Alternatively, the SCS 190 can provide real-time pose tracking 260 to the UEs. The UEs 110 performing media streaming 280 with a streaming service gateway or hub 250, which can be self-hosted, for the home network 270, or operator-provided, for the 5G network domain 210, for media content synchronization. In this example, the media streaming 280 can be from the following exemplary steaming sources 290: Netflix 290-1; YouTube 290-2 (a video-sharing website); and a camera 290-3.

The UE 110 is illustrated having a control module 140, which contains the means, circuitry, and/or programming and circuitry for performing the functions described herein. The SCS 190 is illustrated having a control module 150, which contains the means, circuitry, and/or programming and circuitry for performing the functions described herein. Possible internal configurations of the UE 110 and the SCS 190 are described below.

The XR Description is the information managed by the Spatial Computing Service/Server (SCS) 190. The User Equipment (UE) can be the XR clients that communicate with the SCS to register or query their spatial position within the XR environment, through real-time pose tracking 260. The description of the XR Environment, e.g., the physical or virtual environment, can be part of the XR Description, necessarily, but not absolutely. The streaming service (as the gateway/hub 250) is the media gateway for XR object instances.

Figure 3:
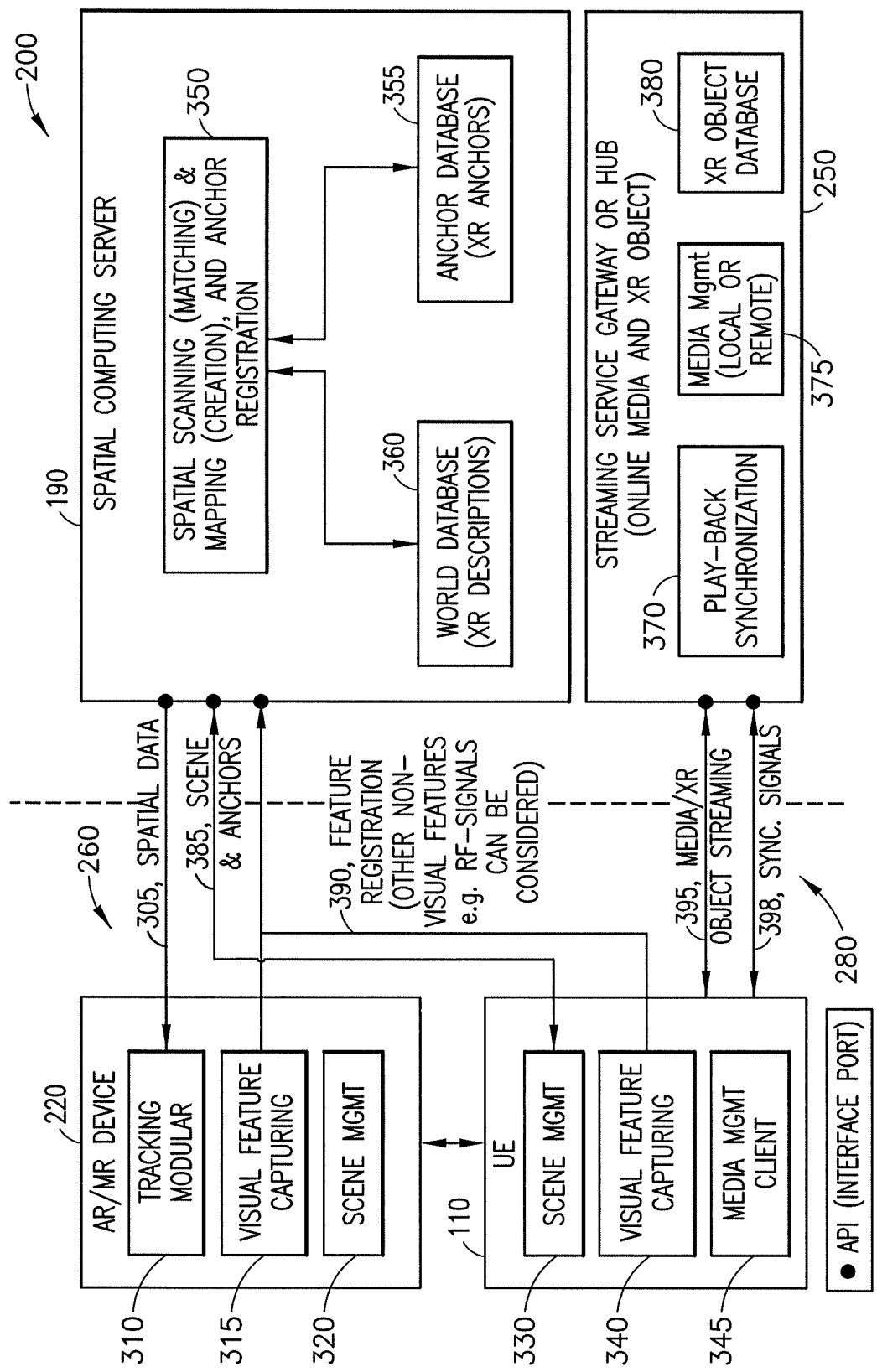
FIG. 3 illustrates a more detailed system breakdown diagram of the system in FIG. 2.

FIG. 3 shows the system 200 in a more detailed structure with individual functional components. The AR/MR device 220 includes the following functions: tracking modular 310; visual feature capturing 315; and scene management (mgmt) 320. The UE 110 includes the following functions: scene mgmt. 330; visual feature capturing 340; and media mgmt. client 345. The spatial computing server (SCS) 190 includes a function 350 that provides spatial scanning (e.g., matching) and mapping (e.g., creation), and anchor registration. The SCS 190 also has a World database 360 (e.g., comprising XR Descriptions) 360 and an Anchor database 355 (e.g., comprising XR Anchors). The following data flows are also illustrated: spatial data 305, scene and (&) anchors 385, feature registration 390 (and other non-visual features, e.g., RF signals can be considered); media/XR object streaming 395; and synchronization (sync.) signals 398. The media streaming 280 flow comprises the media/XR object streaming 395 and synchronization (sync.) signals 398, and the real-time pose tracking flow 260 comprises the spatial data 305. The spatial data 305 can be connected between the SCS 190 and the UE 110, when AR/MR device 220 is one part of the UE. The separation between the AR/MR device 220 and UE 110 is logic only. They can be an all-in-one device. The spatial data communicated between the device and SCS (190) is mainly the real-time pose tracking 260 in FIG. 2.

Some of the blocks (e.g., blocks 310, 315, 320 and 375) in FIG. 3 can be optional to the instant disclosure, but are listed to make the system complete. The UE 110 is the User Equipment that includes functional modules such as Scene management 330, visual (e.g., and non-visual) feature capturing 340, and Media management client 345 (such as a media player like a Netflix client). AR/MR devices 310, 315, and 320 can be an external display device to UE or an internal part of the UE 110.

The SCS 190 includes a world reconstruction (mapping) and anchor registration module 350, an environment storage module (world database 360), and XR anchor storage module (anchor database 355). The server 190 can communicate with the UE 110 via, e.g., an application programming interface (API) directly or over the network (a 5G network, for example). SCS 190 can run in the central cloud or in the Mobile/Multi-Access Edge (MEC) computing environments. The interfaces provide access to XR data such as features and environment description, as well as XR objects for media streaming services.

The streaming service gateway 250 provides all media streaming functionalities and API for XR objects registered in the XR storage (database 380), such as play-back synchronization module 370, media management (Mgmt) module 375, which can be local or remote, and the XR object database 380. When multiple UEs are connected for the same media service/source, the playback synchronization module 370 ensures the synchronized playback experience among UEs.

Examples are now presented for possible implementation. One example concerns possible data structures. The world (both real and virtual) should be described by a structural representation. The XR models of the exemplary embodiments herein (e.g., XR Description, XR Anchor and XR Object) can be realized in any domain specific language (DSL) such as Web X3D (Extensible 3D) or glTF. To demonstrate the syntax of the XR models, glTF is used as one representation example. glTF (GL Transmission Format) is a new specification of 3D scene and 3D models, developed by the Khronos Group 3D Formats Working Group. glTF is designed to be a new vendor- and runtime-neutral format that can be loaded and rendered efficiently. glTF preserves full hierarchical scenes with nodes, meshes, cameras and materials.

Figure 4:
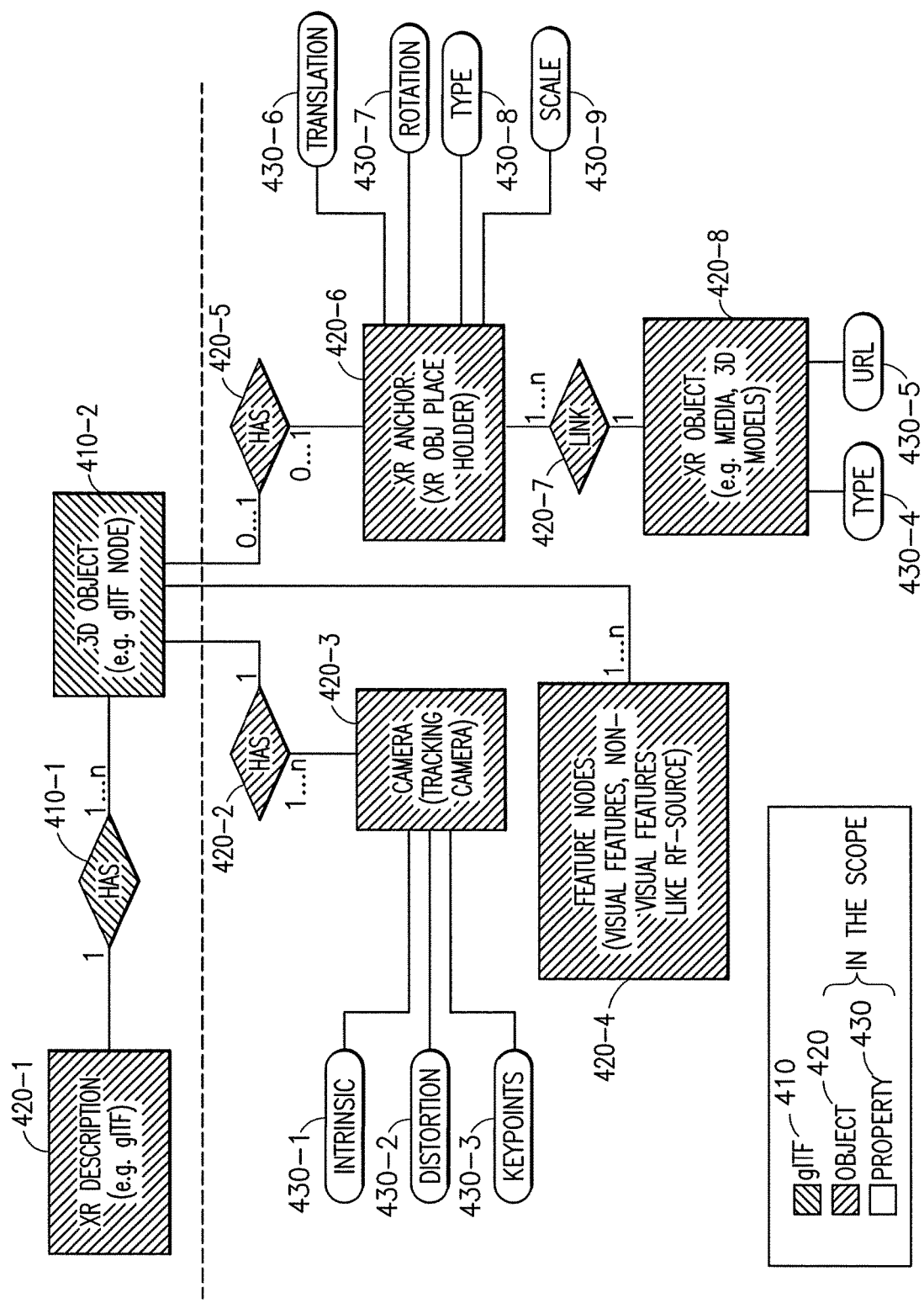
FIG. 4 is an illustration of a class (e.g., object) diagram of exemplary possible relationships between XR Description, XR Anchor and XR Object (glTF extension as one implementation example)

FIG. 4 is an illustration of a class (e.g., object) diagram of exemplary possible relationships between XR Description, XR Anchor and XR Object (glTF extension as one implementation example). This figure shows the relationship of XR models with the 3D objects in glTF, in an exemplary embodiment. Each environment (the scene model) can be represented as one XR Description that comprises many 3D objects (glTF nodes 410). Object nodes 420 and property nodes 430 are also marked, and these are considered new and to be in the scope of the exemplary embodiments herein. To make the structure clear to understand, the extension can be defined in two categories: 1) spatial positioning and tracking nodes; and 2) spatial reference nodes such as XR anchors and XR objects.

The XR description object 420-1 (e.g., glTF) is connected via one connection to a has 410-1 relationship, which allows 1 to n 3D objects 410-2. The 3D object 410-2 is connected via a single connection to the has 420-2 relationship, which allows 1 to n camera objects 420-3 (e.g., tracking cameras). The camera object 420-3 has lens properties such as intrinsic 430-1 and distortion 430-2, and reference properties like keypoints 430-3. The 3D object 410-2 is also connected to one or up to n multiple feature node objects 420-4, such as visual features and non-visual features like an RF source. The 3D object 410-2 is also connected via zero or a single connection to the has 420-5 relationship, which allows zero to a single XR Anchor object 420-6 (e.g., XR Object place holder), which has 1 to n connections to the link object 420-7, which is connected to an XR Object 420-8 (e.g., Media and 3D models). The XR Object 420-8 has properties of type 430-4 and URL 430-5. The XR Anchor object 420-6 has spatial properties such as translation 430-6, rotation 430-7, type 430-8, and scale 430-9. In another option, as an exemplary embodiment, translation 430-6 and rotation 430-7 could be transformation value in ECEF (earth-centered, earth-fixed), also known as ECR (initialism for earth-centered rotational), geographic and Cartesian coordinate system, when the XR description 420-1 uses similar coordinate systems.

Concerning spatial positioning and tracking nodes, glTF defines nodes in a parent-child hierarchy known as the node hierarchy. Typically, a camera node is defined for rendering, where the viewport can be defined by its translation and rotation properties. The concept is extended to support other properties like virtual frames from which the visual computational features are grouped together from one camera (type).

Figure 5:
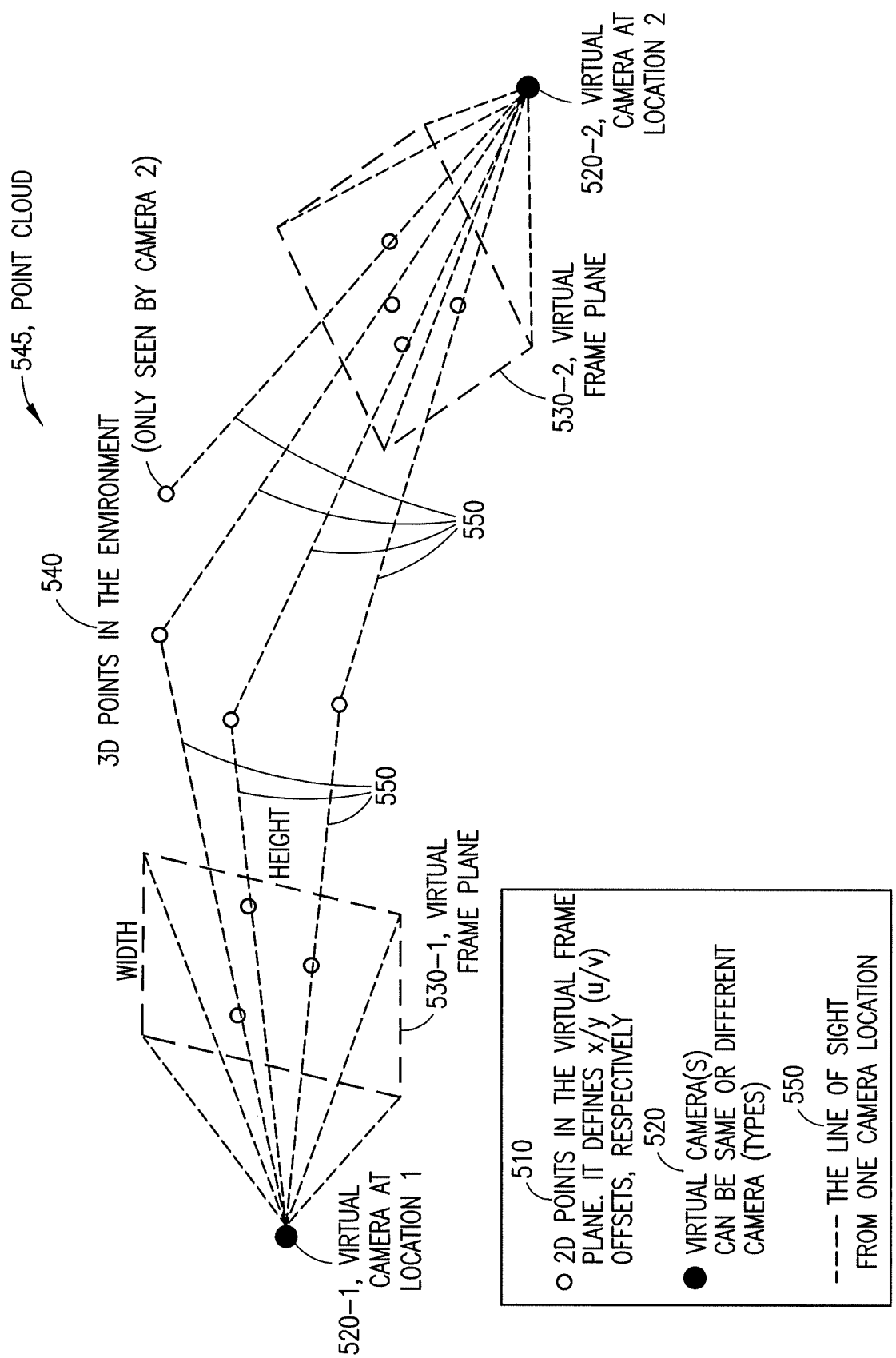
FIG. 5 illustrates two perspective views from two virtual tracking camera locations, in accordance with an exemplary embodiment.

Each tracking camera comprises camera lens properties, and geometry properties like width and height (see FIG. 5). FIG. 5 illustrates two perspective views from two virtual tracking camera locations, in accordance with an exemplary embodiment. There are two virtual cameras 520-1 and 520-2 at locations 1 and 2, respectively. Each camera 520 can be a same or different camera (e.g., types of cameras). There are multiple 2D points 510 in the virtual frame planes 530-1 and 530-2. 2D points 510 define x/y pixel offsets to the image corner, for example, to the upper-left corner, or UN coordinates. Each 3D point 540 has a corresponding 2D point 510 per camera. The dashed lines from the locations 1 and 2 to the points indicate line of sight from one camera location, as indicated by reference 550. 3D points 540 in the environment are shown (where one 3D point 540 is only seen by camera 2). All of the 3D points 540 may be referred to as point cloud 545.

A number of exemplary definitions are presented. The following table is one example of a possible virtual tracking camera object definition:

TABLE 1

| Parameters | Definition |
| --- | --- |
| id | Virtual tracking camera unique identifier used by other spatial models |
| type | Camera lens type. One of "pinhole", "fisheye", "equirectangular" |
| resolution | Width and Height |
| intrinsic | Camera lens intrinsic parameters representing the optical center, focal length of the camera, as well as the skew coefficient. Typically, it is represented as a 3 × 3 homogeneous transformation matrix, plus a lens distortion array |
| extrinsic | Camera transformation parameters representing a rigid transformation from 3-D world coordinate system to the 3-D camera's coordinate system. Typically it is represented as a 4 × 4 homogeneous transformation matrix |
| pixel-meter-scaler | Pixel to meter converter float value. It determines the scaling factor and the 3D model size with respect to the physical world |

The "pixel-meter-scaler" parameter can be provided manually, or measured automatically from any reference object/points with known physical metric values.

Next, an exemplary XR Feature Object Definition follows. The XR Features represents the digital features calculated from one snapshot of the environment at a given spatial location. A snapshot, typically, contains a plurality of XR features. The snapshot is the virtual frame plane in FIG. 5 (described above) points on the plane are feature locations relatively in the plane, seen by one tracking camera. This table defines virtual places and features.

TABLE 2

| Parameters | Definition |
| --- | --- |
| feature_id | ID |
| virtual_frame_id | The virtual frame ID |
| Feature_type | Type of features, can be "visual" or "rf" (radio frequency), "user-defined". |
| feature_descriptor_name | Feature descriptor technology name for various localization techniques. There are many mathematic methods in the field of visual features. The name can be the format of IANA's MIME structure, for example. In the RF domains, it defines, for example, the received signal strength (RSSI) of radios. |
| feature_data | Feature data (encoded or raw dataset) |
| virtual_frame_uv_position | The relative position in the virtual frame, with respect to the origin (left/top corner) |
| virtual_frame_resolution | Virtual frame plane size in width and height (pixel) |
| point_cloud_ids | The array of point IDs that can be seen by this virtual camera. Used for visual feature type. |
| location | 3D spatial location, which can be local to the environment; or global in a global coordinate system, e.g., ECEF (earth-centered, earth-fixed) system |

Concerning the many mathematic methods in the field of visual features, see, e.g., Rekhil M Kumar et al., "A Survey on Image Feature Descriptors", International Journal of Computer Science and Information Technologies (IJCSIT), Vol. 5 (6), 2014, 7668-7673.

The trackable 3D points (see the 3D point cloud 545, e.g., all the 3D points 540 in FIG. 5) can be defined as follows.

Each 3D point 540 can be associated with one or multiple virtual features (see Table 2). The following is a table for a 3D point cloud 545:

TABLE 3

| Parameters | Definition |
| --- | --- |
| point_id | ID |
| location | 3D location coordinates, such as x, y, z value. |
| type | Local or global coordinates. When it is local type, the location is relative to the location of its parent 3D object, if applicable |

In the case of RF features, it is typically useful to define a plurality of radio signals observed/received at each virtual camera location. Those signals can be used for an RSSI-based technique to determine the localization and orientation in the environment.

The XR Anchor Object Definition is illustrated in an example by the following table:

TABLE 4

| Parameters | Definition |
| --- | --- |
| anchor_id | ID |
| anchor_object | 3D object where this anchor is associated with. It can be the URI that points to the address of the object; or the object ID directly in FIG. 4 (see, e.g., block 410-2). |
| xr_object_id | XR Object associated with the anchor. |
| binding_type | The ways how the XR object can be positioned relatively to the XR anchor. It can be one of "relative" and "absolute". When it is "relative", the position parameter is the spatial position relative to the 3D anchor object. When it is "absolute", the "position" parameter indicates the absolute 3D position with respect to the origin of the XR scene/environment. |
| location | x/y/z float value about translation |
| rotation | Raw/roll/pitch float value about rotation |
| viewing_binding | Decides how the XR anchor reacts to the UE. It can be one of "static" and "reactive". When it is "static", its position remains unchanged regardless to the viewer. When it is "reactive", its position is updated and could be e.g., facing the viewer as a preference. |

Concerning the XR Object Definition, an XR object can be any 3D object that is linked to media representation. Media representation type could be one of the following:
1) virtual screen (e.g., virtual camera/monitor/keyboard/phone dial pad, or even an app screen);
2) volumetric data (e.g., point cloud 545);
3) 3D model (or another glTF model or any graphic representation);
4) 2D image/video;
5) 2D/3D text;
6) XR object can be interactive (e.g., touch/move/write/talk/poke) and may have haptic feedback (e.g., using W3C Accessibility or W3C XR Accessibility;
7) XR object can contain a description about the GUI for rendering the UI and handling user input, for example on-screen virtual keyboard or playback control panel.

The XR Object can have properties for user interaction, such as different operations an XR client can perform. For example, XR Object can have the "media-source" parameter that indicates the source of the media, e.g., the URL.

The XR Object can have other properties like "state", which can be used for state synchronization among multiple-devices. The "state" could be a compound parameter that contains some timed-parameters, e.g., for live streaming objects, its statistics parameters may contain the play-back state and timestamp information.

As for XR Scene Description, XR scene description can be any language that describe the environment or 3D models, such as Web3D's VRML/X3D in XML file format, and Khronos's glTF in JSON format. Here, glTF is used as one embodiment to demonstrate how XR objects work with 3D scene languages.

Figure 6:
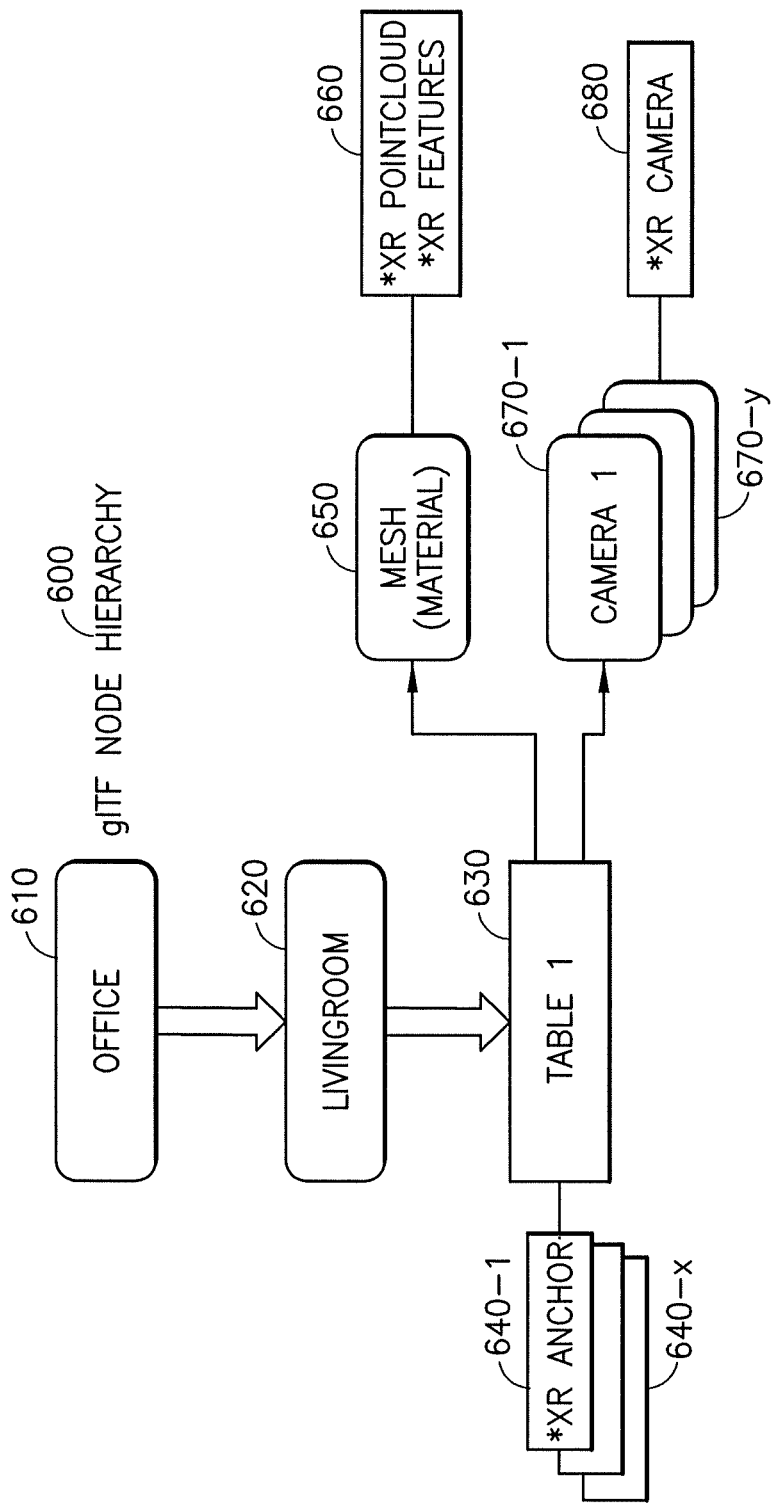
FIG. 6 illustrates an adaptation/extension to a GLTF structure in an exemplary embodiment.

See FIG. 6, which illustrates an adaptation/extension to a GLTF structure in an exemplary embodiment. This glTF hierarchy 600 includes an office 610, a living room 620 and a table 1 630. The table 1 630 has multiple (e.g., x) XR anchors 640-1 to 640-x and is associated with mesh with special materials 650, which has in block 660 an XR point cloud 545 and XR features. As is known, materials are attributes of 3D objects, although the special materials 650 here are for tracking and not necessarily for visual enhancement. The table 1 630 is also associated with y cameras 670-1 to 670-y, which are associated with an XR camera 680.

In one embodiment, each node defines one parameter referred to as "scaling", which affects all sub-nodes which are children of the current node. The scaling parameter is used to support a multi-scaling representation from multiple inputs and the SCS applies the fusion job to combine them together into one final scale. The "scaling" parameter can preserve their original scaling factors for any further operations like optimization.

Exemplary implementation of the SCS 190 is now described. One vision-based implementation is provided to demonstrate one known SLAM (Simultaneous Localization and Mapping) approach based on visual digital features of the XR environments. For the known SLAM approach, see M. Y. I. Idris, H. Arof, E. M. Tamil, N. M. Noor and Z. Razak, 2009, "Review of Feature Detection Techniques for Simultaneous Localization and Mapping and System on Chip Approach", Information Technology Journal, 8: 250-262. Other approaches like LSD-SLAM use original media sources like pictures for the reconstruction of the XR environment and tracking purposes (see Jeroen Zijlmans, "LSD-slam and ORB-slam2, a literature based explanation", Medium, Aug. 23, 2017). To gain a higher level of privacy, no image of video of real environments is needed but only the digitalized digests or so-called point features are used to position the XR devices. Exemplary methods are in two parts regarding a client side and a server (SCS) side. The client side that concerns feature descriptors streaming and the server side that takes care of the SCS related operations.

Turning to FIG. 7, including both FIGS. 7A and 7B, this figure. illustrates a visual SLAM implementation of SCS, in accordance with exemplary embodiment. FIG. 7A implements SCS initialization 720 and FIG. 7B implements an SCS update 760. In FIG. 7A, reference 710 indicates a UE 110-1 creates stream frames from a leading device, which is a client device as UE 110-1. The UE 110-1 has camera information (info), from which feature descriptors 715 are created and sent to the SCS 190, which performs a map initialization using SLAM in this example. The SCS 190 initializes the global map 725, including SCS mapping points, SCS keyframes, and other information (infos.).

In FIG. 7B, the UE 110-2 streams frames as a follower device (see reference 750), as another client. The UE 110-2 creates feature descriptors 755 per device and sends this to the SCS 190. The SCS 190 performs an SCS update by performing localization 765 using SLAM-like techniques, such as ORBSLAM2 (see Raul Mur-Artal and Juan D. Tardos, "ORB-SLAM2: an Open-Source SLAM System for Monocular, Stereo and RGB-D Cameras", arXiv: 1610.06475, 20 Oct. 2016) in this example, and also by mapping 770 using similar techniques such as ORBSLAM2. The SCS 190 updates the global map 725 with updated SCS mapping points, SCS keyframes, and other information (infos.).

Concerning the client side (e.g., by the UE 110), the client side takes care of identifying the devices and generation of relevant features. Thereafter, these information are packaged and sent to the SCS 190. The identification of the devices collects information related to the camera device such as camera type, intrinsic parameter, pixel size, lens distortion, and the like. Subsequently, the image features can be extracted using popular feature extraction methods such as SURF (see Herbert Bay et al., "SURF: Speeded Up Robust Features", A. Leonardis, H. Bischof, and A. Pinz (Eds.): ECCV 2006, Part I, LNCS 3951, pp. 404-417, 2006.), SIFT (see Herbert Bay et al.), ORB (see Ethan Rublee et al., "ORB: an efficient alternative to SIFT or SURF", 2011 IEEE International Conference on Computer Vision), and the like. Since an exemplary system handles ever more data to run on mobile devices with limited computational resources, there is a growing need to avoid storing original images (e.g., keyframes) which can be huge memory-wise for the system and also can create possible privacy concerns. As a result, one option chosen herein is for a feature-based SLAM method over direct methods. An exemplary feature-based method uses key edges (edge-based features) or regions (region-based features) of images, and thus avoids transferring original images to the SCS. In addition, there is also a growing need for local descriptors that are fast to compute, fast to match, and memory efficient. In an exemplary system herein, a BRIEF feature descriptor (see Michael Calonder et al., "BRIEF: Binary Robust Independent Elementary Features", In: Daniilidis K., Maragos P., Paragios N. (eds) Computer Vision—ECCV 2010. ECCV 2010, Lecture Notes in Computer Science, vol 6314, Springer, Berlin, Heidelberg.) is used. BRIEF use binary strings as an efficient feature point descriptor, very fast both to build, match and easily outperforms other fast descriptors in terms of speed and terms of recognition rate in many cases. In an exemplary implementation, a two-variance technique is proposed, which can either allow the user to directly send keypoint features or their feature descriptors, based on the privacy requirements.

With respect to the server side (e.g., SCS 190), there are two stages here in an exemplary embodiment, which are the initialization and updating. See the examples in FIG. 7 of initialization 720 and updating 760.

For SCS Initialization 720, the initialization creates a global map from videos of the leading client using SLAM method presented in ORBSLAM2. In some other cases where there is already running session in the server, it just initializes the global map from previous sessions. Previous sessions can include data from RF technologies or lasers. The global map 725 stored in the SCS 190 contains the Scene descriptor, which contains each Mapping Point $p_i$ and each Keyframe $K_i$ (also referred to as a Stamp) as defined below.

1) Each Mapping Point $p_i$ (distorted or undistorted) may store the following.
  a) The 3D position $P_i$ of the mapping point in the world coordinate system.
  b) The normal $n_i$ with key frame optical center that observes the mapping point.
  c) A representative ORB descriptor $D_i$, which is the associated ORB whose hamming distance is minimum with respect to all other associated descriptors in the keyframes in which the point is observed.
  d) The maximum $d_{max}$ and minimum $d_{min}$ distances at which the point can be observed, according to the scale invariant limits of the ORB features.

2) Each Keyframe $K_i$ (or Stamp) may store the following.
  a) The camera pose $R_i$, $T_i$ that transform points from world coordinate to camera coordinates.
  b) The camera intrinsic, including focal length, principal point.
  c) ORB features extracted in a frame associated or not to a map point, such as Distortion $d_i$.

3) Additional information such as possible global threshold values.

Please refer to OrbSLAM2 for a better explanation regarding the parameters.

For the SCS Update 760, given a system of SCS already running with associated global map, one idea is to update the initial global map 725. This is achieved by validating incoming SCS keyframes from follower devices, thereafter updating them on the SCS global map 725. This updating process is directly based on Visual SLAM described in ORBSLAM2. This process is briefly summarized below.

First, under SCS update-localization process 765, use motion-only Bundle adjustment (BA) to determine camera pose with previous frame in the global map initialization. If current camera pose estimation failed, then use place recognition to perform a global relocalization. Thereafter, retrieve a covisibility graph representing the maintained "keyframe—mapping points" connections using camera pose and feature matches. Then, match keyframe features with the global map points, followed by additional camera pose optimization. Finally, a tracking thread decides if a new keyframe is valid and thus can be inserted or not.

Under an SCS update-mapping process 770, perform local BA to achieve an optimal 3D reconstruction in the camera pose surrounding using new features from current keyframe. Next, determine the feature points correspondences in the covisibility graph to triangulate new 3D points. Then, use an exigent point culling policy during tracking to retain only high-quality points and remove redundant keyframes. Finally, if a loop from past keyframes to current one is detected, a similarity transformation is used to estimate the loop drift. Both sides of the loop are aligned and duplicated points are fused. Finally, a pose graph optimization over similarity constraints is performed to achieve global consistency. These whole processes are well explained in ORBSLAM2.

Figure 8A:
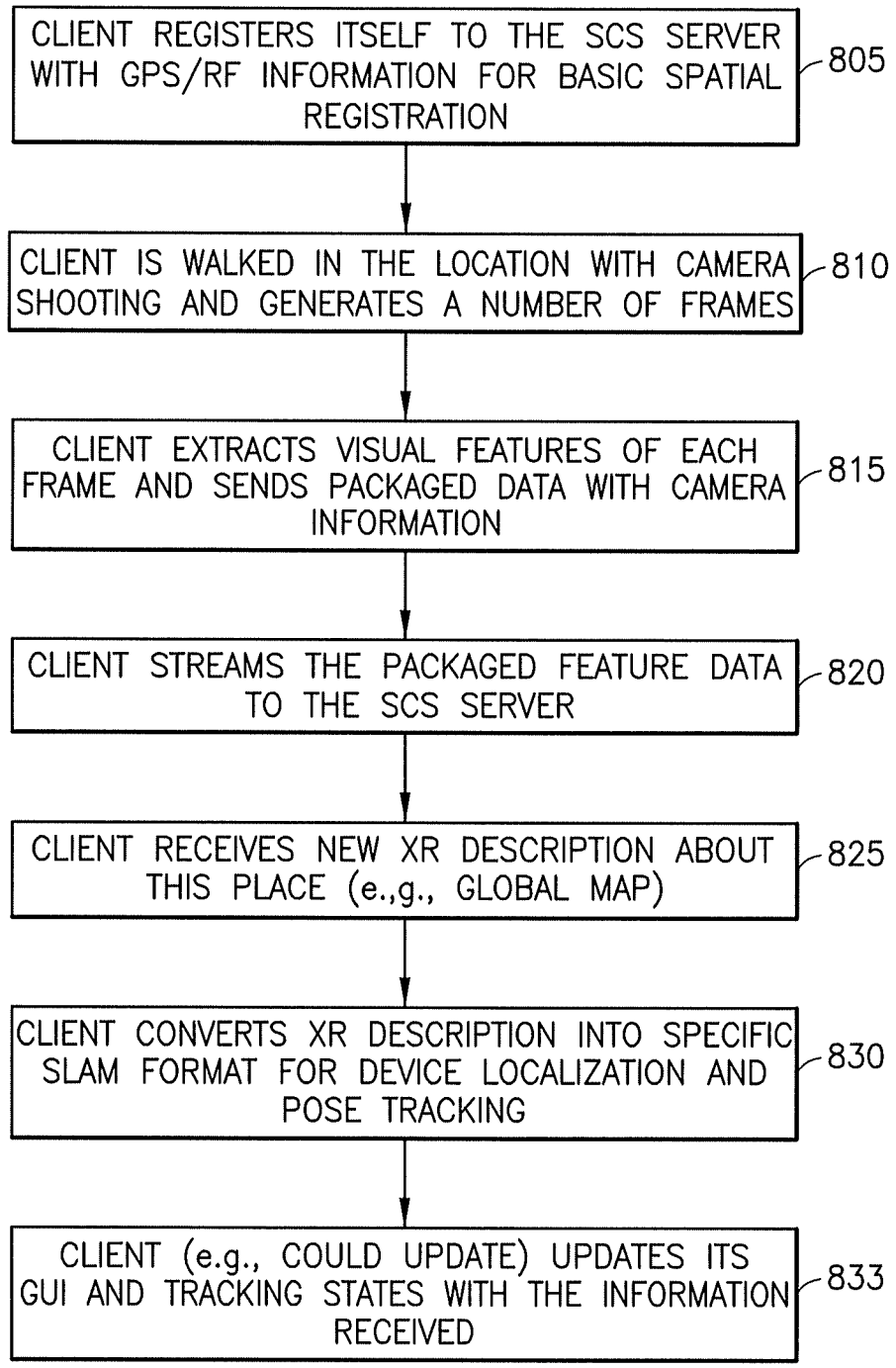
Figure 8B:
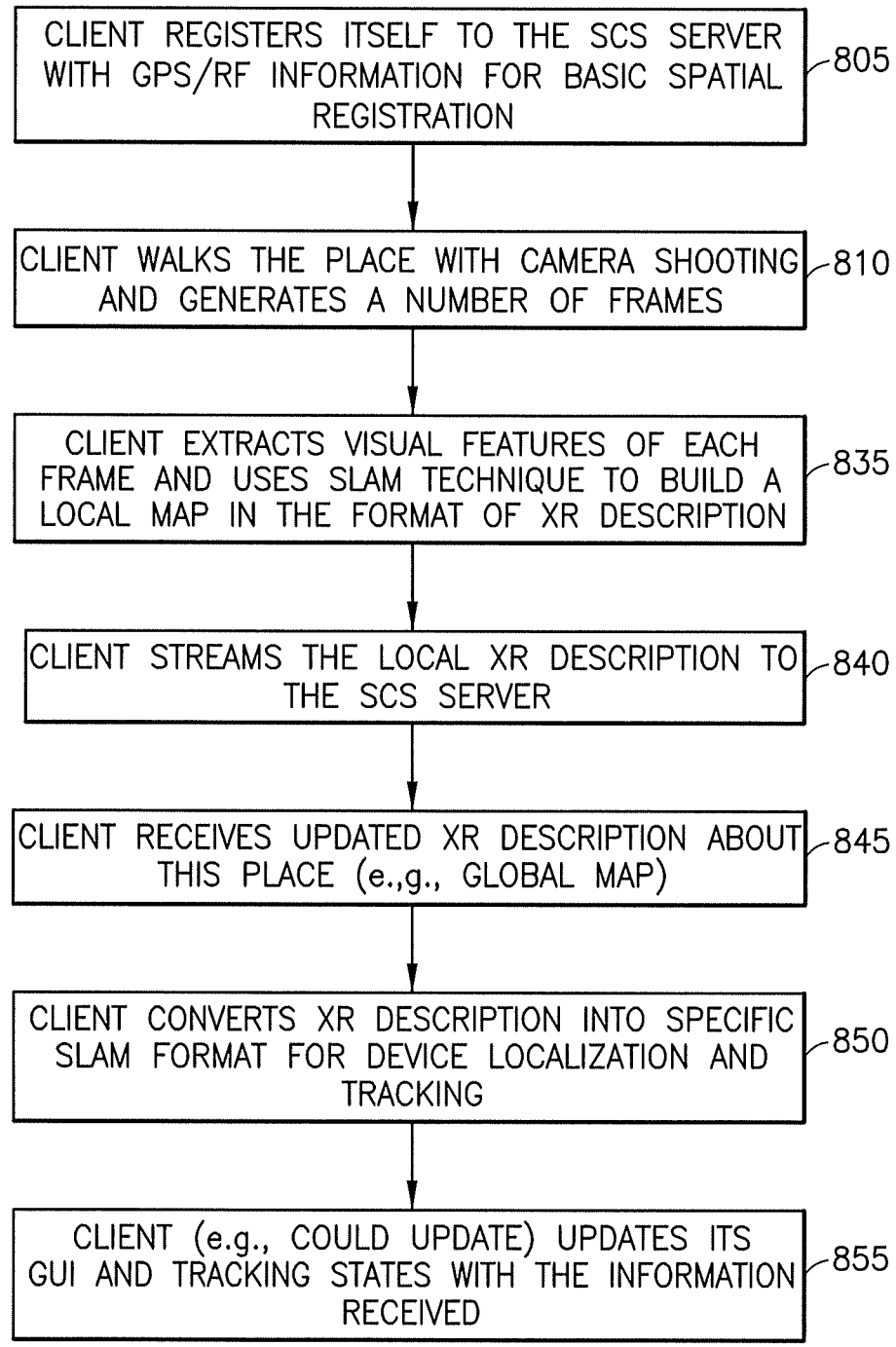
FIG. 8B is a flow diagram showing the steps that a client can create a temporary/intermediate XR description (e.g., a local map) and SCS fuses the local map created by the client into a global one (e.g., global registration), in accordance with exemplary embodiments.

Typical workflows are now described. FIG. 8A is a flow diagram showing the operations that XR description (e.g., a global map) is performed completely on the SCS. FIG. 8B is a flow diagram showing the steps that a client can create a temporary/intermediate XR description (e.g., a local map) and SCS fuses the local map created by the client into a global one (e.g., global registration). FIGS. 8A and 8B illustrate the operation of exemplary methods, a result of execution of computer program instructions embodied on a computer readable memory, functions performed by logic implemented in hardware, and/or interconnected means for performing functions in accordance with exemplary embodiments.

In FIG. 8A, in block 805, the client (e.g., UE 110) registers itself to the SCS 190 with GPS/RF information for basic spatial registration. In block 810, the client is walked in the location with camera shooting and generates a number of frames. In block 815, the client extracts visual features of each frame and sends packaged data with camera information toward the SCS 190. In block 820, the client streams the packaged feature data to the SCS 190. The client, in block 825, receives new XR Description about this place (e.g., a global map). In block 830, the client converts XR Description into specific SLAM format for device localization and pose tracking. In block 833, the client (e.g., could update) updates its GUI and tracking states with the information received. That is, if an update could be done, the client can perform the update.

In FIG. 8B, blocks 805 and 810 are the same as in FIG. 8A. In block 835, the client extracts visual features of each frame and uses SLAM technique to build a local map in the format of XR Description. The client, in block 840, streams the local XR Description to the SCS 190. In block 845, the client receives updated XR Description about this place (e.g., global map). In block 850, the client converts XR Description into specific SLAM format for device localization and tracking. In block 855, the client (e.g., could update) updates its GUI and tracking states with the information received.

Figure 9A:
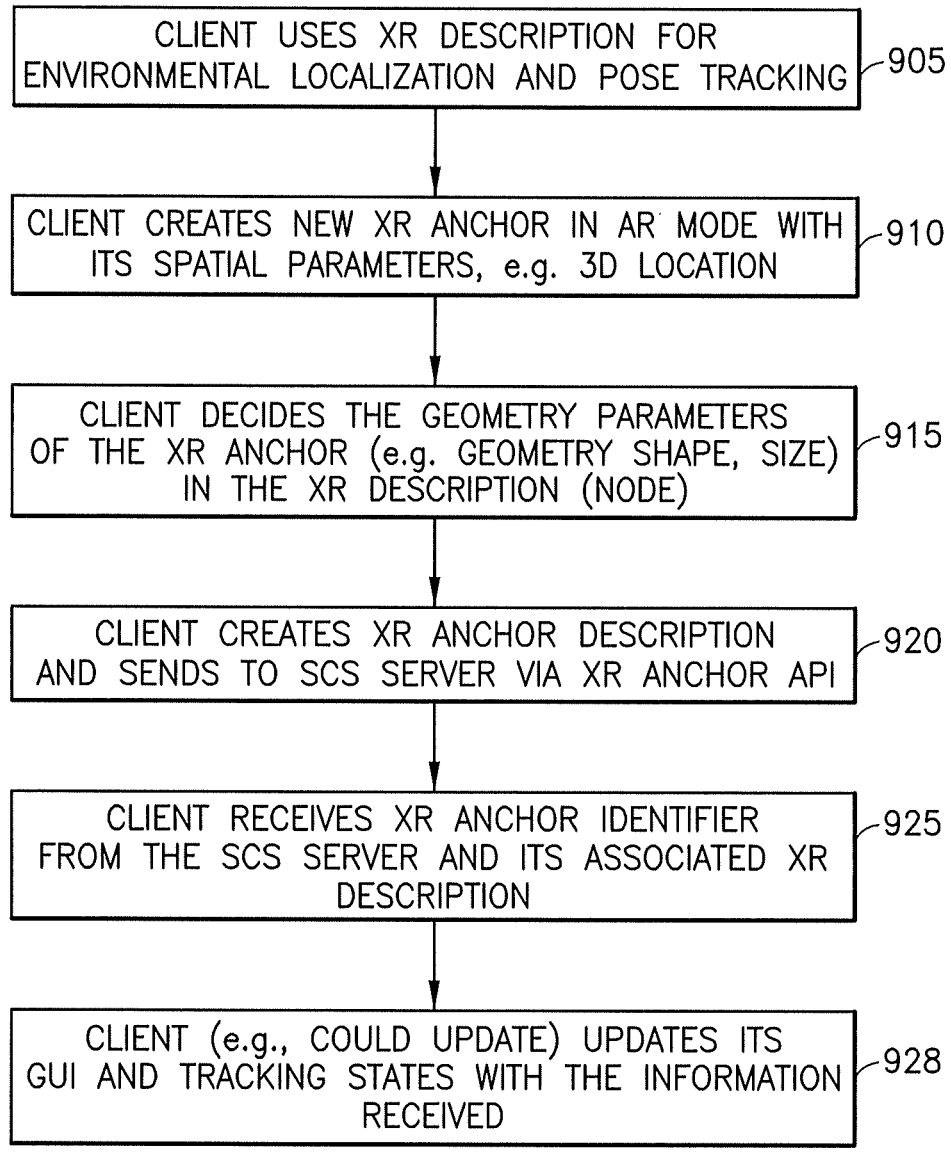
FIG. 9A is a flow diagram showing XR Node-binding XR Anchor creation.
Figure 9B:
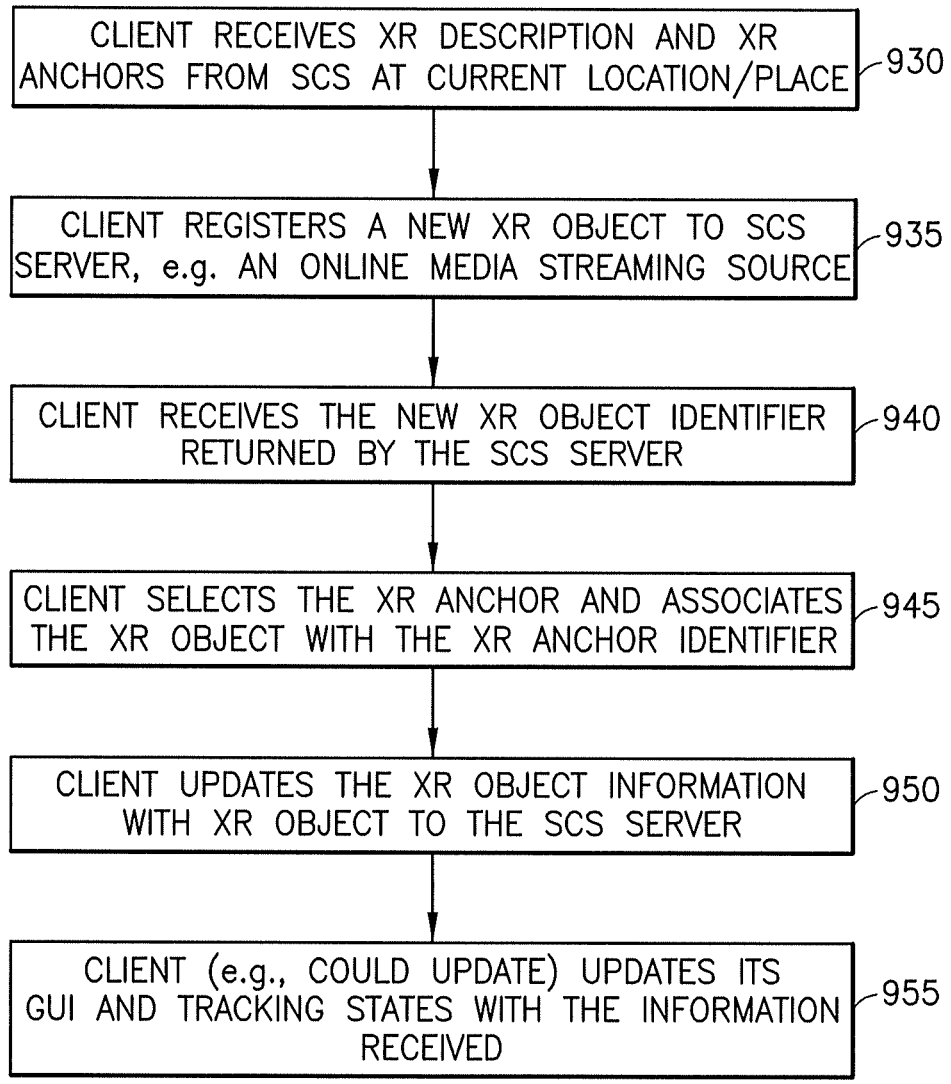
FIG. 9B is a flow diagram showing XR Object registration, in accordance with exemplary embodiments.

FIG. 9A is a flow diagram showing XR Node-binding XR Anchor creation, and FIG. 9B is a flow diagram showing XR Object registration, in accordance with exemplary embodiments. It is noted that the XR Anchor can be independent on the nodes in the XR Description. So, its "binding-type" is "absolute" (see Table 4). In this mode, the geometry of the XR Anchor can be any geometric shapes/types. The geometry description can be embedded or externally-referenced, which can be implementation-specific. FIGS. 9A and 9B illustrate the operation of exemplary methods, a result of execution of computer program instructions embodied on a computer readable memory, functions performed by logic implemented in hardware, and/or interconnected means for performing functions in accordance with exemplary embodiments.

In FIG. 9A, in block 905, the client (e.g., UE 110) uses XR Description for environmental localization and pose tracking, and in block 910, the client creates new XR Anchor in AR mode with its spatial parameters, e.g., 3D location. The client, in block 915, decides the geometry parameters of the XR Anchor (e.g., geometry shape, size) in the XR Description (e.g., a node thereof). In block 920, the client creates XR Anchor description and sends to the SCS Server, e.g., via an XR Anchor API. In block 925, the client receives an XR Anchor Identifier from the SCS 190 and its associated XR Description. In block 928, the client (e.g., could update) updates its GUI and tracking states with the information received.

In FIG. 9B, the client in block 930 receives XR Description and XR Anchors from the SCS while the client is at a current location/place. In block 935, the client registers a new XR Object to the SCS 190, e.g., an online media streaming source. In block 940, the client receives the new XR Object identifier returned by the SCS Server 220. The client, in block 945, selects the XR Anchor and associates the XR Object with the XR anchor identifier. In block 950, the client updates the XR Object information with XR Object to the SCS Server 220. In block 955, the client (e.g., could update) updates its GUI and tracking states with the information received.

Figure 10:
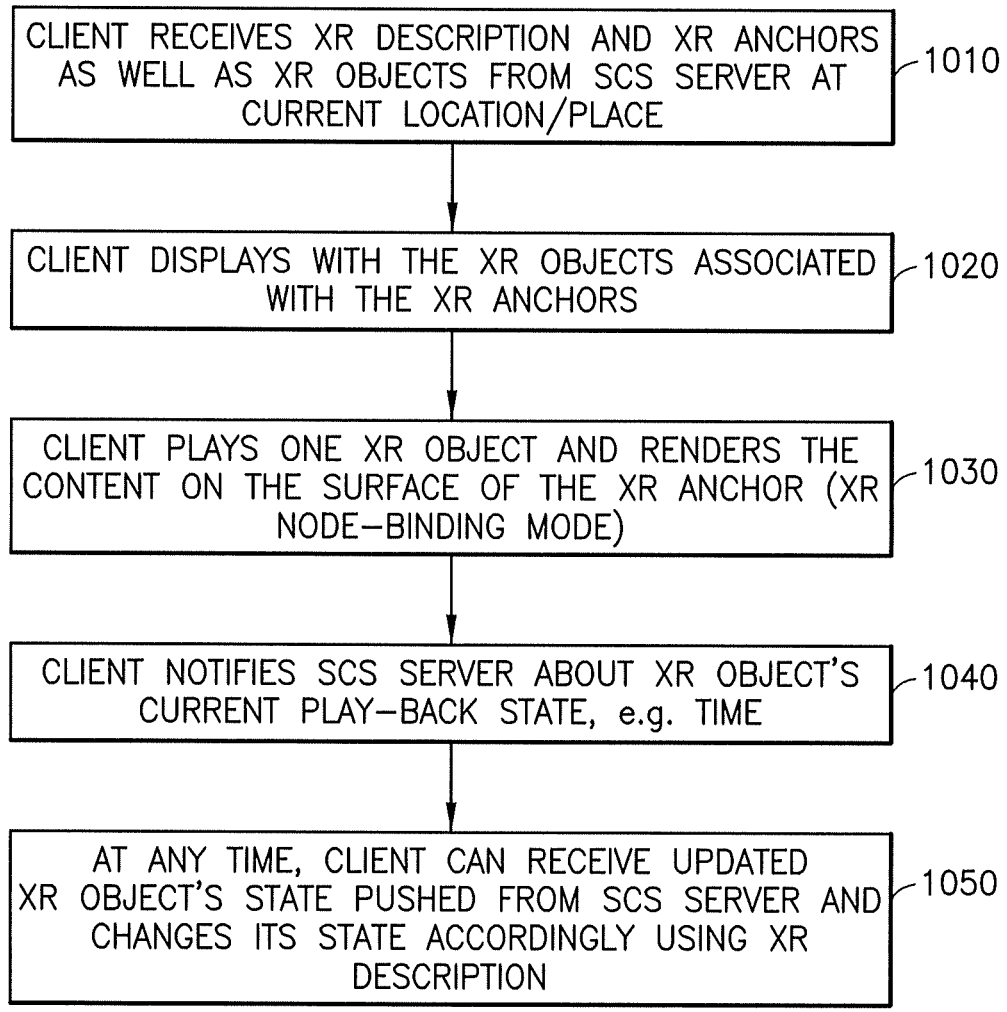
FIG. 10 is a flow diagram showing one interaction and synchronization mechanism between the client and the SCS regarding the XR object state changes, in accordance with an exemplary embodiment.

FIG. 10 is a flow diagram showing one interaction and synchronization mechanism between the client and the SCS regarding the XR object state changes, in accordance with an exemplary embodiment. FIG, 10 illustrates the operation of an exemplary method, a result of execution of computer program instructions embodied on a computer readable memory, functions performed by logic implemented in hardware, and/or interconnected means for performing functions in accordance with exemplary embodiments.

In block 1010, the client receives XR Description and XR Anchors as well as XR Objects from the SCS 220 at the current location/place. In block 1020, the client displays with the XR Objects associated with the XR Anchors. The client, in block 1030, plays one XR Object and renders the content on the surface of the XR Anchor (XR node-binding mode). In block 1040, the client notifies the SCS 220 about XR Object's current play-back state, e.g., time. At any time, the client, in block 1050, can receive updated XR Object's state pushed from the SCS Server and changes its state accordingly using XR Description.

Concerning architectures in relevant standards, there are at least two relevant standards in which these XR components can be integrated, or become parts of the standards. One such standard is 3GPP TSG (Technical Specification Group) SA (Services and System Aspects) sub-group 4 (SA4 Codec), Release 17, 3GPP TR 26.928 V16.0.0 (2020-03). In particular, the existing SGSTAR or EMSA study items, or SGMSA. 3GPP TR 26.928 (Extended Reality (XR) in 5G) of Release 16 presents dozens of XR use cases, and XR Spatial Mapping and Localization is defined and will be standardized at some point. See 3GPP TR 26.928 V16.0.0 (2020-03). The SCS in FIG. 11 can be one implementation of an exemplary embodiment.

Figure 11:
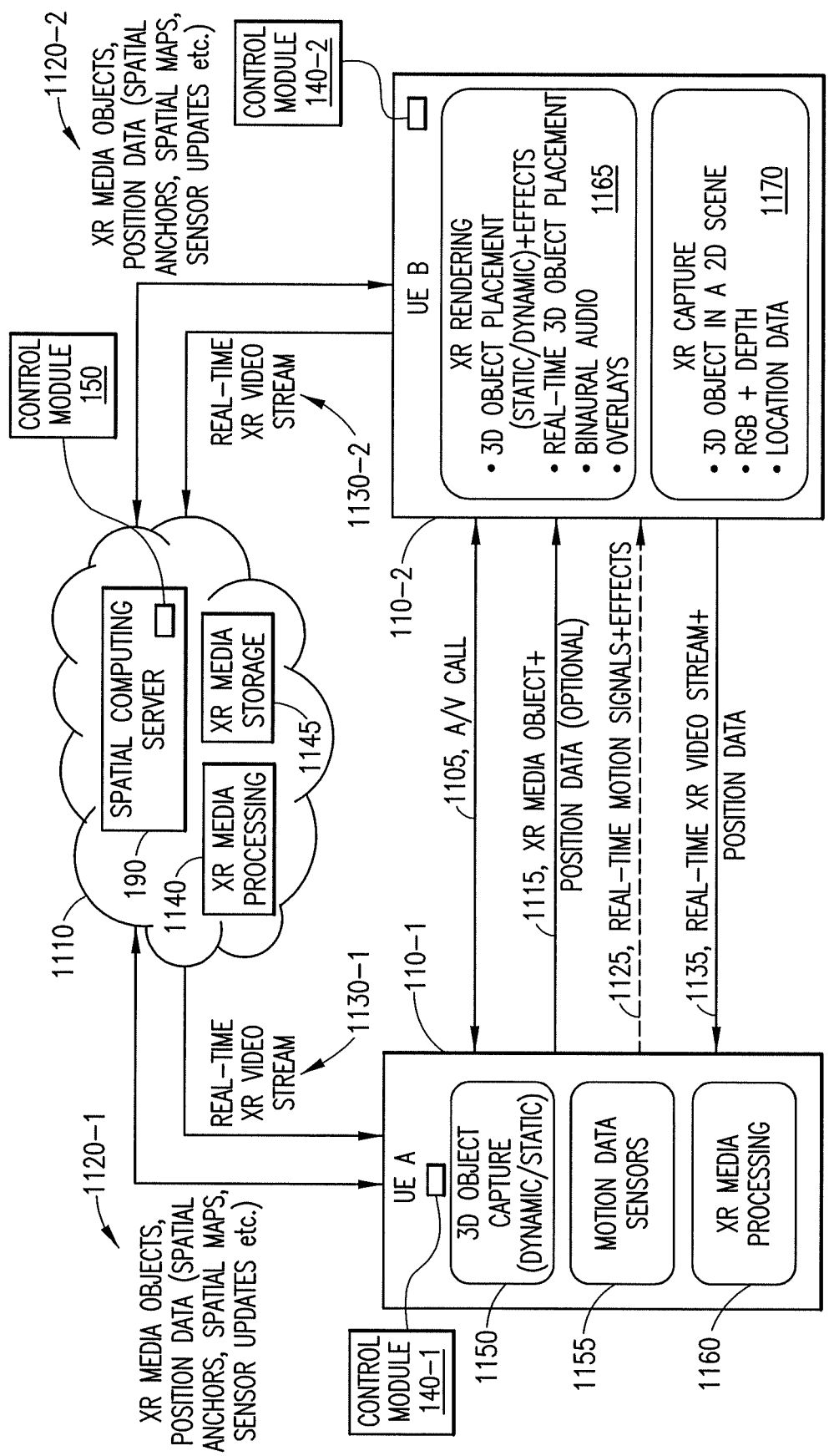
FIG. 11 illustrates a possible implementation of an exemplary embodiment for a version of Extended Reality (XR) in 5G.

FIG. 11 illustrates a possible implementation of an exemplary embodiment for a version of Extended Reality (XR) in 5G. FIG. 11 is a modified version of FIG. 5.3-1 from 3GPP TR 26.928 V16.0.0 (2020-03), entitled "Real-time sharing of XR content". This modified version illustrates where elements of the exemplary embodiments herein may be implemented.

In FIG. 11, the SCS 190, with its control module 150 to implement the exemplary functionality herein, is part of a cloud 1110. There are two UEs 110, UE A 110-1 and UE B 110-2, each with a respective control module 140-1, 140-2 that implement the exemplary functionality herein. The UE A 110-1 includes the following functionality: a 3D object capture module 1150 (including both dynamic and static capture); motion sensors 1155; and an XR media processing module 1160. The UE A 110-1 is in communication with the SCS 190 and the communication involves (see reference 1120-1) XR media objects and position data, e.g., including spatial anchors, spatial maps, sensor updates, and the like. The communication also involves a real-time XR video stream 1130-1.

The cloud 1110 also has XR media processing 1140 and XR media storage 1145, both accessible by the SCS 190. The UE B 110-2 is in communication with the SCS 190 and the communication involves (see reference 1120-2) XR media objects and position data, e.g., including spatial anchors, spatial maps, sensor updates, and the like. The communication also involves a real-time XR video stream 1130-2. The UE B 110-2 implements the following functionality: XR rendering 1165 and XR capture 1170. The XR rendering 1165 includes the following: 3D object placement (static/dynamic) and effects; real-time 3D object placement; binaural audio; and overlays. The XR capture 1170 includes the following: 3D object in a 2D scene; RGB data (e.g., using a Red, Green, Blue color model) and depth; and location data.

The two UEs also have communications between them, including an A/V (audio/visual) call 1105, an XR media object and position data 1115 (which is optional), real-time motion signals and effects 1125, and real-time XR video stream and position data 1135.

Examples may be applied to ETSI's AR Framework (ARF). The ARF documents (e.g., see "Augmented Reality Framework (ARF); AR framework architecture", ETSI GS ARF 003 V1.1.1 (2020-03)) specify a functional reference architecture for AR components, systems and services; and introduces the characteristics of an AR system and describes the functional building blocks of the AR reference architecture and their mutual relationships. The instant SCS 190 and the XR objects can be mapped to ARF. For instance, SCS 190 can be mapped to "World Analysis" and XR objects can be placed under "Scene Management" and "AR Authoring" blocks in ARF.

Deployment options and related embodiments and now presented. With respect to architecture, for Cloud/Edge deployment, the SCS 190 may be placed in the cloud or an edge network, for example, as a function of MPEG NBMP. Features may be calculated on UEs 110 first and then uploaded to the SCS 190 for localization and mapping (e.g., not video or video frames with privacy protection in mind, such that raw video will not be uploaded to protect privacy).

For a local deployment (see, e.g., the home network 270 in FIG. 1), beacon devices might be used. As an example, in one embodiment, there may be a dedicated device (a beacon) in a room that acts as SCS 190, in the sense that all users can come in and connect to the beacon device. The device is like an edge server: UEs 110 that enter the space will register to the beacon. The video data is processed on the beacon (e.g., feature extraction), visual features are sent to the network SCS 190, which can assist in heavy computations, and data fusion (e.g., collecting data from multiple beacons to create a larger map).

Another option for local deployment is use of a master/slave relationship. In another embodiment, two UEs want to share spatial data, one becomes the master (SCS 190) and is responsible for feature storage and synchronization between the devices. The other (slave) UE sends signals to the master One UE can perform SLAM first and the other UE can just perform localization (e.g., tracking).

As for data flow, data flow from the UE to the SCS may be sporadic (when recording features) or continuous.

Figure 12:
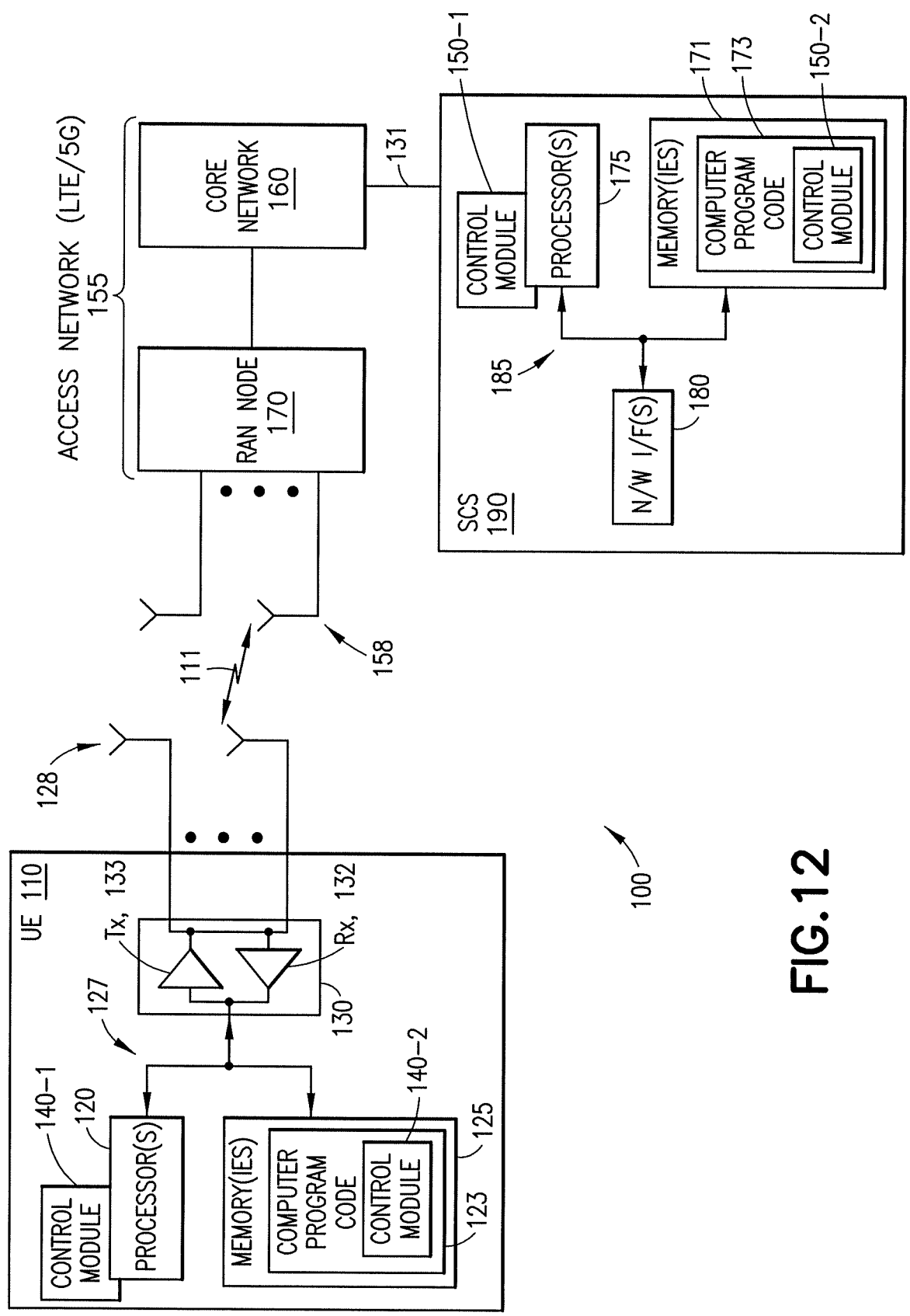
FIG. 12 is a block diagram of one possible and non-limiting exemplary system in which the exemplary embodiments may be practiced.

Turning to FIG. 12, this figure is a block diagram of one possible and non-limiting exemplary system 100 in which the exemplary embodiments may be practiced. A user equipment (UE) 110, access network (e.g., LTE and/or 5G) 155, and SCS 190 are illustrated. The access network 155 includes a radio access network (RAN) node 170 and a core network 160. The RAN node 170 can be an LTE node (e.g., an eNB) or 5G node (e.g., a gNB) and the core network 160 is a corresponding LTE and/or 5G network.

A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a control module 140, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The core network 160 communicates with the SCS 190 via link 131. The link 131 may be implemented via wired, wireless, or both wired and wireless technology. The SCS 190 includes one or more processors 175, one or more memories 171, and one or more network interfaces (N/W I/F(s)) 180, interconnected through one or more buses 185. The one or more memories 171 include computer program code 173. The SCS 190 includes a control module 150, comprising one of or both parts 150-1 and/or 150-2, which may be implemented in a number of ways. The control module 150 may be implemented in hardware as control module 150-1, such as being implemented as part of the one or more processors 175. The control module 150-1 may be implemented also as an integrated circuit or through other hardware such as a programmable gate array. In another example, the control module 150 may be implemented as control module 150-2, which is implemented as computer program code 173 and is executed by the one or more processors 175. For instance, the one or more memories 171 and the computer program code 173 may be configured to, with the one or more processors 175, cause the SCS 190 to perform one or more of the operations as described herein.

The following are additional examples.

Example 1. A method, comprising:

receiving, from a client device in a wireless network, feature information describing at least part of one or more extended reality scenes in an extended reality environment at the client device;

forming an extended reality description in an extended reality description format corresponding to the feature information;

storing the extended reality description format in a database; and providing at least a portion of the stored extended reality description format in a representational format upon request of the client device or other client devices viewing the one or more extended reality scenes and assisting the positioning of corresponding client devices in the extended reality environment.

Example 2. The method of example 1, wherein:

the feature information comprises a plurality of environment features from the one or more extended reality scenes in the extended reality environment at the client device;

forming an extended reality description comprises generating an extended reality description, corresponding to the plurality of environment features, in the extended reality description format.

Example 3. The method of example 2, wherein the plurality of environment features comprise environment features that have been generated by the user equipment for one or more real objects in the one or more extended reality scenes.

Example 4. The method of any one of examples 2 or 3, wherein storing the extended reality description format comprises storing the extended reality description format using a hierarchical data structure that represents spatial relationships of the plurality of environment features with respect to a three-dimensional representation of the one or more extended reality scenes.

Example 5. The method of example 4, wherein the data structure is stored using one or both of a persistent format or a payload format.

Example 6. The method of either example 4 or 5, wherein the data structure has capabilities of multi-scaling to compute an absolute scale with respect to a physical environment, or supporting multiple client devices, or both the multi-scaling and supporting of the multiple client devices.

Example 7. The method of any one of examples 2 to 6, wherein generating the extended reality description comprises generating an extended reality description corresponding to the environment features that can be used for device localization and environment reconstruction technologies using both vision-based and radio frequency-based technologies.

Example 8. The method of example 1, wherein:
the feature information comprises an extended reality description corresponding to environment features from the one or more extended reality scenes;
forming an extended reality description in an extended reality description format comprises fusing the received extended reality description from the client device with the stored extended reality description format in the database.

Example 9. The method of example 8, wherein fusing the extended reality description from the client device with the extended reality description format further comprises one or more of the following operations:
converting the received extended reality description to a same or a common coordinate system as used by previously stored extended reality description format;
converting different extended reality information sources to a generic standardized format;
scaling information in the received extended reality description up or down to a same global size to be used for the extended reality description format;
updating existing extended reality description in the database with newly received extended reality data elements from the client device.

Example 10. The method of example 1, wherein:
the feature information comprises a representation of visual data corresponding to environment features from the one or more extended reality scenes;
forming an extended reality description in an extended reality description format comprises forming an received extended reality description from the received representation of visual data.

Example 11. The method of example 10, wherein forming a received extended reality description further comprises fusing the formed extended reality description with previously stored extended reality description.

Example 12. The method of any one of examples 1 to 11, wherein the feature information is received by the server or sent by the client device without corresponding original image or video information.

Example 13. The method of any one of examples 1 to 12, wherein the representational format comprises graphics library transmission format.

Example 14. A method, comprising:
capturing, by a client device in a wireless network, environmental visual data and generating feature information from the environmental visual data, the feature information describing at least part of one or more extended reality scenes in an extended reality environment at the client device; and
sending, by the client device, the generated feature information toward a server.

Example 15. The method of example 14, wherein:
generating feature information from the environmental visual data comprises generating a plurality of extended reality features, as the feature information, within the extended reality environment for the environmental visual data; and
sending, by the client device, the generated feature information toward a server comprises sending the plurality of extended reality features toward the server.

Example 16. The method of example 14, wherein:
the generating feature information from the environmental visual data comprises generate an extended reality description on the client device; and
sending, by the client device, the generated feature information toward a server comprises uploading by the client device the extended reality description to the server for extended description registration and fusion with an existing extended reality description format stored in a database.

Example 17. The method of example 14, wherein:
the generating feature information from the environmental visual data comprises generating a representation of visual data describing at least part of one or more extended reality scenes in the extended reality environment at the client device; and
sending, by the client device, the generated feature information toward a server further comprises streaming the representation of visual data to the server for processing into an extended reality description.

Example 18. The method of any of examples 14 to 17, wherein the sending the generated feature information is performed without sending corresponding original image or video information.

Example 19. A method, comprising:
localizing, by a client device in a wireless system and in response to extended reality description being available, the client device to a physical environment with help of the extended reality description, the localizing placing the client device into a three-dimensional environment to which the extended reality description refers;
generating extended reality anchors and extended reality objects to place the extended reality anchors and the extended reality objects in the three-dimensional environment to which the extended reality description refers;
binding the extended reality anchors and the extended reality objects to create corresponding one or more links between the extended reality anchors and the extended reality objects; and
sending the extended reality anchors and the extended reality objects to the server, associated with correspondent extended reality description.

Example 20. A computer program, comprising code for performing the methods of any of examples 1 to 19, when the computer program is run on a computer.

Example 21. The computer program according to example 20, wherein the computer program is a computer program product comprising a computer-readable medium bearing computer program code embodied therein for use with the computer.

Example 22. The computer program according to example 20, wherein the computer program is directly loadable into an internal memory of the computer.

Example 23. An apparatus, comprising means for performing:

receiving, from a client device in a wireless network, feature information describing at least part of one or more extended reality scenes in an extended reality environment at the client device;

forming an extended reality description in an extended reality description format corresponding to the feature information;

storing the extended reality description format in a database; and providing at least a portion of the stored extended reality description format in a representational format upon request of the client device or other client devices viewing the one or more extended reality scenes and assisting the positioning of corresponding client devices in the extended reality environment.

Example 24. The apparatus of example 23, wherein:

the feature information comprises a plurality of environment features from the one or more extended reality scenes in the extended reality environment at the client device;

forming an extended reality description comprises generating an extended reality description, corresponding to the plurality of environment features, in the extended reality description format.

Example 25. The apparatus of example 24, wherein the plurality of environment features comprise environment features that have been generated by the user equipment for one or more real objects in the one or more extended reality scenes.

Example 26. The apparatus of any one of examples 24 or 25, wherein storing the extended reality description format comprises storing the extended reality description format using a hierarchical data structure that represents spatial relationships of the plurality of environment features with respect to a three-dimensional representation of the one or more extended reality scenes.

Example 27. The apparatus of example 26, wherein the data structure is stored using one or both of a persistent format or a payload format.

Example 28. The apparatus of either example 26 or 27, wherein the data structure has capabilities of multi-scaling to compute an absolute scale with respect to a physical environment, or supporting multiple client devices, or both the multi-scaling and supporting of the multiple client devices.

Example 29. The apparatus of any one of examples 24 to 28, wherein generating the extended reality description comprises generating an extended reality description corresponding to the environment features that can be used for device localization and environment reconstruction technologies using both vision-based and radio frequency-based technologies.

Example 30. The apparatus of example 23, wherein:

the feature information comprises an extended reality description corresponding to environment features from the one or more extended reality scenes;

forming an extended reality description in an extended reality description format comprises fusing the received extended reality description from the client device with the stored extended reality description format in the database.

Example 31. The apparatus of example 30, wherein fusing the extended reality description from the client device with the extended reality description format further comprises one or more of the following operations:

converting the received extended reality description to a same or a common coordinate system as used by previously stored extended reality description format;

converting different extended reality information sources to a generic standardized format;

scaling information in the received extended reality description up or down to a same global size to be used for the extended reality description format;

updating existing extended reality description in the database with newly received extended reality data elements from the client device.

Example 32. The apparatus of example 23, wherein:

the feature information comprises a representation of visual data corresponding to environment features from the one or more extended reality scenes;

forming an extended reality description in an extended reality description format comprises forming an received extended reality description from the received representation of visual data.

Example 33. The apparatus of example 32, wherein forming a received extended reality description further comprises fusing the formed extended reality description with previously stored extended reality description.

Example 34. The apparatus of any one of examples 23 to 33, wherein the feature information is received by the server or sent by the client device without corresponding original image or video information.

Example 35. The apparatus of any one of examples 23 to 34, wherein the representational format comprises graphics library transmission format.

Example 36. An apparatus, comprising means for performing:

capturing, by a client device in a wireless network, environmental visual data and generating feature information from the environmental visual data, the feature information describing at least part of one or more extended reality scenes in an extended reality environment at the client device; and sending, by the client device, the generated feature information toward a server.

Example 37. The apparatus of example 36, wherein:

generating feature information from the environmental visual data comprises generating a plurality of extended reality features, as the feature information, within the extended reality environment for the environmental visual data; and sending, by the client device, the generated feature information toward a server comprises sending the plurality of extended reality features toward the server.

Example 38. The apparatus of example 36, wherein:

the generating feature information from the environmental visual data comprises generate an extended reality description on the client device; and sending, by the client device, the generated feature information toward a server comprises uploading by the client device the extended reality description to the server for extended description registration and fusion with an existing extended reality description format stored in a database.

Example 39. The apparatus of example 36, wherein:

the generating feature information from the environmental visual data comprises generating a representation of visual data describing at least part of one or more extended reality scenes in the extended reality environment at the client device; and sending, by the client device, the generated feature information toward a server further comprises streaming the representation of visual data to the server for processing into an extended reality description.

Example 40. The apparatus of any of examples 36 to 39, wherein the sending the generated feature information is performed without sending corresponding original image or video information.

Example 41. An apparatus, comprising means for performing:

localizing, by a client device in a wireless system and in response to extended reality description being available, the client device to a physical environment with help of the extended reality description, the localizing placing the client device into a three-dimensional environment to which the extended reality description refers;

generating extended reality anchors and extended reality objects to place the extended reality anchors and the extended reality objects in the three-dimensional environment to which the extended reality description refers;

binding the extended reality anchors and the extended reality objects to create corresponding one or more links between the extended reality anchors and the extended reality objects; and sending the extended reality anchors and the extended reality objects to the server, associated with correspondent extended reality description.

Example 42. The apparatus of any preceding apparatus example wherein the means comprises:

at least one processor; and at least one memory including computer program code, the at least one memory and computer program code configured to, with the at least one processor, cause the performance of the apparatus.

Example 43. An apparatus, comprising:

one or more processors; and one or more memories including computer program code, wherein the one or more memories and the computer program code are configured, with the one or more processors, to cause the apparatus to perform operations comprising:

receiving, from a client device in a wireless network, feature information describing at least part of one or more extended reality scenes in an extended reality environment at the client device;

forming an extended reality description in an extended reality description format corresponding to the feature information;

storing the extended reality description format in a database; and providing at least a portion of the stored extended reality description format in a representational format upon request of the client device or other client devices viewing the one or more extended reality scenes and assisting the positioning of corresponding client devices in the extended reality environment.

Example 44. An apparatus, comprising:

one or more processors; and one or more memories including computer program code, wherein the one or more memories and the computer program code are configured, with the one or more processors, to cause the apparatus to perform operations comprising:

capturing, by a client device in a wireless network, environmental visual data and generating feature information from the environmental visual data, the feature information describing at least part of one or more extended reality scenes in an extended reality environment at the client device; and sending, by the client device, the generated feature information toward a server.

Example 45. An apparatus, comprising:

one or more processors; and one or more memories including computer program code, wherein the one or more memories and the computer program' code are configured, with the one or more processors, to cause the apparatus to perform operations comprising:

localizing, by a client device in a wireless system and in response to extended reality description being available, the client device to a physical environment with help of the extended reality description, the localizing placing the client device into a three-dimensional environment to which the extended reality description refers;

generating extended reality anchors and extended reality objects to place the extended reality anchors and the extended reality objects in the three-dimensional environment to which the extended reality description refers;

binding the extended reality anchors and the extended reality objects to create corresponding one or more links between the extended reality anchors and the extended reality objects; and sending the extended reality anchors and the extended reality objects to the server, associated with correspondent extended reality description.

As used in this application, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 12. A computer-readable medium may comprise a computer-readable storage medium (e.g., memories 125 and 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments of the invention, these descriptions should not be viewed in a limiting sense. Rather, there are several variations and modifications which may be made without departing from the scope of the present invention.

The following abbreviations that may be found in the specification and/or the drawing figures are defined as follows:

2D two-dimension
3D three-dimension
3GPP third-generation partnership project
5G fifth generation
API application programming interface
app application
AR augmented reality
ARF augmented reality framework
A/V audio/visual
BA bundle adjustment
DSL domain specific language
eNB (or eNodeB) evolved Node B (e.g., an LTE base station)
ER extended reality
glTF or GLTF Graphics Library Transmission Format
gNB base station for 5G/NR, i.e., a node providing
NR user plane and control plane protocol terminations towards the UE, and connected via the NG interface to the 5GC
GPS global positioning system
GUI graphical user interface
IEC International Electrotechnical Commission
ISO International Organization for Standardization
MEC multi-access edge computing
mgmt or Mgmt management
MPEG motion picture experts group
MR mixed reality
NBMP Network-Based Media Processing
PC personal computer
RF radio frequency
SCS spatial computing server
SLAM simultaneous localization and mapping
synch. synchronization
UE user equipment (e.g., a wireless, typically mobile device)
URL uniform resource locator
VR virtual reality
X3D Extensible 3D
XR extended reality

What is claimed is:

1. A method, comprising:
    receiving, from a client device in a wireless network, feature information describing at least part of one or more extended reality scenes in an extended reality environment at the client device, the receiving determining information indicating whether the feature information comprises one or both of visual features or non-visual features, wherein the feature information is defined using a structure providing an indication of feature type that indicates at least visual features or non-visual features, the non-visual features comprising radio frequency features, and where indications of both visual and non-visual features use a same structure;
    forming an extended reality description in an extended reality description format corresponding to the feature information;
    storing the extended reality description format in a database; and
    providing at least a portion of the stored extended reality description format in a representational format upon request of the client device or other client devices viewing the one or more extended reality scenes and assisting positioning of corresponding client devices in the extended reality environment.

2. The method of claim 1, wherein:
    the feature information comprises a plurality of environment features from the one or more extended reality scenes in the extended reality environment at the client device; and
    the forming an extended reality description comprises generating an extended reality description, corresponding to the plurality of environment features, in the extended reality description format.

3. The method of claim 1, wherein:
    the received feature information comprises an extended reality description received from the client device and corresponding to environment features from the one or more extended reality scenes; and
    the forming an extended reality description in an extended reality description format comprises fusing the received extended reality description from the client device with the stored extended reality description format in the database.

4. An apparatus, comprising:
    one or more processors; and
    one or more memories storing instructions that, when executed by the one or more processors, cause the apparatus at least to perform:
    receiving, from a client device in a wireless network, feature information describing at least part of one or more extended reality scenes in an extended reality environment at the client device, the receiving determining information indicating whether the feature information comprises one or both of visual features or non-visual features, wherein the feature information is defined using a structure providing an indication of feature type that indicates at least visual features or non-visual features, the non-visual features comprising radio frequency features and where indications of both visual and non-visual features use a same structure;
    forming an extended reality description in an extended reality description format corresponding to the feature information;
    storing the extended reality description format in a database; and
    providing at least a portion of the stored extended reality description format in a representational format upon request of the client device or other client devices viewing the one or more extended reality scenes and assisting positioning of corresponding client devices in the extended reality environment.

5. The apparatus of claim 4, wherein:
the feature information comprises a plurality of environment features from the one or more extended reality scenes in the extended reality environment at the client device; and
the forming an extended reality description comprises generating an extended reality description, corresponding to the plurality of environment features, in the extended reality description format.

6. The apparatus of claim 5, wherein the plurality of environment features comprise environment features that have been generated by the client device for one or more real objects in the one or more extended reality scenes.

7. The apparatus of claim 5, wherein storing the extended reality description format comprises storing the extended reality description format using a hierarchical data structure that represents spatial relationships of the plurality of environment features with respect to a three-dimensional representation of the one or more extended reality scenes.

8. The apparatus of claim 7, wherein the data structure is stored using one or both of a persistent format or a payload format.

9. The apparatus of claim 7, wherein the data structure has capabilities of multi-scaling to compute an absolute scale with respect to a physical environment, or supporting multiple client devices, or both the multi-scaling and supporting of the multiple client devices.

10. The apparatus of claim 5, wherein generating the extended reality description comprises generating an extended reality description corresponding to the environment features that can be used for device localization and environment reconstruction technologies using both vision-based and radio frequency-based technologies.

11. The apparatus of claim 4, wherein:
the received feature information comprises an extended reality description received from the client device and corresponding to environment features from the one or more extended reality scenes; and
the forming an extended reality description in an extended reality description format comprises fusing the received extended reality description from the client device with the stored extended reality description format in the database.

12. The apparatus of claim 11, wherein fusing the extended reality description from the client device with the extended reality description format further comprises one or more of the following operations:
converting the received extended reality description to a same or a common coordinate system as used by previously stored extended reality description format;
converting different extended reality information sources to a generic standardized format;
scaling information in the received extended reality description up or down to a same global size to be used for the extended reality description format; or
updating existing extended reality description in the database with newly received extended reality data elements from the client device.

13. The apparatus of claim 4, wherein:
the feature information comprises a representation of visual data corresponding to environment features from the one or more extended reality scenes; and
the forming an extended reality description in an extended reality description format comprises forming a received extended reality description from the received representation of visual data.

14. The apparatus of claim 13, wherein forming a received extended reality description further comprises fusing the formed extended reality description with previously stored extended reality description.

15. The apparatus of claim 4, comprising a server, wherein the feature information is received by the server or sent by the client device without corresponding original image or video information.

16. The apparatus of claim 4, wherein the representational format comprises graphics library transmission format.

17. The apparatus of claim 4, wherein:
the one or more memories further store instructions that, when executed by the one or more processors, cause the apparatus at least to perform: receiving from the client device one or more extended reality anchors and one or more extended reality objects that place the one or more extended reality anchors and the one or more extended reality objects in the one or more extended reality scenes in the extended reality environment at the client device; and
the forming comprises forming the extended reality description in the extended reality description format corresponding to the one or more extended reality anchors and one or more extended reality objects.

18. The apparatus of claim 4, wherein the structure further comprises feature data corresponding to the visual or non-visual features and location of the features in a three-dimensional space or visual or non-visual features that point to the location of another structure or object or feature in a three-dimensional space.

19. The apparatus of claim 18, wherein the structure further comprises for visual features a name describing a localization technique and for radio frequency features one or more received signal strengths for corresponding one or more radios.

20. An apparatus, comprising:
one or more processors; and
one or more memories storing instructions that, when executed by the one or more processors, cause the apparatus at least to perform:
capturing, by a client device in a wireless network, environmental visual data and generating feature information from the environmental visual data, the generated feature information describing at least part of one or more extended reality scenes in an extended reality environment at the client device; and
sending, by the client device, the generated feature information toward a server, wherein the generated feature information is defined using a structure providing an indication of feature type that indicates at least visual features or non-visual features, the non-visual features comprising radio frequency features, and where indications of both visual and non-visual features use a same structure.

21. The apparatus of claim 20, wherein:
the generating feature information from the environmental visual data comprises generating a plurality of extended reality features within the extended reality environment for the environmental visual data; and
the sending, by the client device, the generated feature information toward a server comprises sending the plurality of extended reality features toward the server.

22. The apparatus of claim 20, wherein:
the generating feature information from the environmental visual data comprises generating an extended reality description on the client device; and the sending, by the client device, the generated feature information toward a server comprises uploading by the client device the extended reality description to the server for extended description registration and fusion with an existing extended reality description format stored in a database.

23. The apparatus of claim 20, wherein:
the generating feature information from the environmental visual data comprises generating a representation of visual data describing at least part of one or more extended reality scenes in the extended reality environment at the client device; and
sending, by the client device, the generated feature information toward a server further comprises streaming the representation of visual data to the server for processing into an extended reality description.

24. The apparatus of claim 20, wherein the sending the generated feature information is performed without sending corresponding original image or video information.

25. An apparatus, comprising:
one or more processors; and
one or more memories storing instructions that, when executed by the one or more processors, cause the apparatus at least to perform:
localizing, by a client device in a wireless system and in response to extended reality description being available, the client device to a physical environment with help of the extended reality description, the localizing placing the client device into a three-dimensional environment to which the extended reality description refers;
generating extended reality anchors and extended reality objects to place the extended reality anchors and the extended reality objects in the three-dimensional environment to which the extended reality description refers;
binding the extended reality anchors and the extended reality objects to create corresponding one or more links between the extended reality anchors and the extended reality objects, wherein the one or more links include binding types that can be one of relative or absolute and indicate how the extended reality objects are positioned relative to corresponding extended reality anchors; and
sending the extended reality anchors and the extended reality objects, along with indications of the one or more links, to a server, associated with correspondent extended reality description, wherein the extended reality objects comprise feature information defined using a structure providing an indication of feature type that indicates at least visual features or non-visual features, the non-visual features comprising radio frequency features, and where indications of both visual and non-visual features use a same structure.

\* \* \* \* \*